United States Patent
Flores Sandoval et al.

(10) Patent No.: US 12,545,843 B2
(45) Date of Patent: Feb. 10, 2026

(54) RANDOM ACRYLIC TERPOLYMERS OF CONTROLLED MOLECULAR MASS EMPLOYED IN THE DESTABILIZATION OF W/O SIMPLE AND/OR O/W/O COMPLEX EMULSIONS IN CRUDE OILS

(71) Applicant: Instituto Mexicano del Petróleo, Mexico City (MX)

(72) Inventors: César Andrés Flores Sandoval, Mexico City (MX); Flavio Salvador Vázquez Moreno, Mexico City (MX); Patricia Pérez Romo, Mexico City (MX); Gerardo Zavala Olivares, Mexico City (MX); Citlally Janinne Vargas Martínez, Mexico City (MX); Gerardo Nicolas Rodríguez Araujo, Mexico City (MX); Geanine Lisbeth Manobanda Navas, Mexico City (MX); Metzil Corona Estrada, Mexico City (MX); Carlos David Rodríguez Araujo, Mexico City (MX); Héctor Alejandro Aranda Hernández, Mexico City (MX); Enrique Cevada Maya, Mexico City (MX)

(73) Assignee: Instituto Mexicano del Petróleo, Mexico City (MX)

( * ) Notice: Subject to any disclaimer, the term of this patent is extended or adjusted under 35 U.S.C. 154(b) by 202 days.

(21) Appl. No.: 18/476,641

(22) Filed: Sep. 28, 2023

(65) Prior Publication Data
US 2025/0051654 A1 Feb. 13, 2025

(30) Foreign Application Priority Data
Aug. 11, 2023 (MX) .................. MX/a/2023/009450

(51) Int. Cl.
*C10G 33/04* (2006.01)
*C08F 218/08* (2006.01)
(Continued)

(52) U.S. Cl.
CPC ............ *C10G 33/04* (2013.01); *C08F 218/08* (2013.01); *C08F 220/14* (2013.01);
(Continued)

(58) Field of Classification Search
CPC .................. C08F 218/08; C08F 220/14; C08F 220/1804; C08F 220/281;
(Continued)

(56) References Cited

U.S. PATENT DOCUMENTS

| | | | |
|---|---|---|---|
| 4,741,835 A | 5/1988 | Jacques | |
| 8,815,960 B2 | 8/2014 | Cendejas Santana | |

(Continued)

FOREIGN PATENT DOCUMENTS

| | | |
|---|---|---|
| CA | 2852863 C | 11/2016 |
| CA | 3013494 C | 12/2020 |

(Continued)

OTHER PUBLICATIONS

CJ Vargas Martinez "Síntesis y Evaluación de Erpolímeros Acrílicos Aleatorios Para el Deshidratado de Aceites Crudos Extra-Pesados" Universidad Veracruzana, 2018(1-9 pages).

(Continued)

*Primary Examiner* — Ellen M Mcavoy
*Assistant Examiner* — Chantel Graham
(74) *Attorney, Agent, or Firm* — FisherBroyles, LLP; Jason P. Mueller

(57) ABSTRACT

The present disclosure belongs to the field of chemical products for petroleum conditioning, in particular to the field of demulsifying agents. The disclosure concerns the application of random terpolymers based on alkyl acrylate-
(Continued)

ethylene alkanoate-alkoxyalkyl acrylate to destabilize simple emulsions of the water-in-crude oil (W/O) type and/or complex emulsions of the crude oil-in-water-in-crude oil (O/W/O) type present in crude oils with gravities from 6 to 40° API, in order to remove the emulsified water and salts dissolved in the latter. Its application is mainly focused on wells to avoid formation damage caused by emulsions, in offshore units, triphasic separation units, and in onshore units prior to the refining process.

10 Claims, 10 Drawing Sheets

(51) Int. Cl.
    *C08F 220/14*      (2006.01)
    *C08F 220/28*      (2006.01)

(52) U.S. Cl.
    CPC .. *C08F 220/281* (2020.02); *C10G 2300/1033* (2013.01); *C10G 2300/201* (2013.01); *C10G 2300/308* (2013.01)

(58) Field of Classification Search
    CPC ...... C10G 2300/1033; C10G 2300/201; C10G 2300/308; C10G 33/04
    See application file for complete search history.

(56) References Cited

U.S. PATENT DOCUMENTS

| | | |
|---|---|---|
| 9,120,885 B2 | 9/2015 | Castro Sotelo |
| 10,125,226 B2 | 11/2018 | Flores Sandoval |
| 10,213,708 B2 | 2/2019 | Cevada Maya |
| 10,221,349 B2 | 3/2019 | Hernandez Carbajal |
| 10,793,783 B2 | 10/2020 | Flores Sandoval |
| 10,975,185 B2 | 4/2021 | Hernández Carbajal |
| 10,982,031 B2 | 4/2021 | Hernández Carbajal |
| 11,261,282 B2 | 3/2022 | Flores Sandoval |
| 2010/0140141 A1* | 6/2010 | Cendejas Santana ............ C08G 65/2624 528/211 |
| 2021/0277314 A1 | 9/2021 | Flores Sandoval |
| 2022/0106530 A1 | 4/2022 | Sandoval |
| 2022/0135886 A1 | 5/2022 | Flores Sandoval |

FOREIGN PATENT DOCUMENTS

| | | | |
|---|---|---|---|
| CA | 2987447 C | 8/2021 | |
| MX | 338861 | 4/2016 | |
| MX | 2018002971 | 9/2019 | |
| MX | 2020002212 | 2/2020 | |
| MX | 2019005132 | 11/2020 | |
| MX | 378417 | 12/2020 | |
| MX | 383630 | 6/2021 | |
| MX | 20210008781 | 7/2021 | |
| MX | 386485 | 9/2021 | |
| MX | 2020010501 | 4/2022 | |
| MX | 2022005169 | 4/2022 | |
| MX | 2020011505 | 5/2022 | |
| MX | 2022008218 | 6/2022 | |
| WO | WO-2024206435 A1 * | 10/2024 | .............. C08L 91/06 |

OTHER PUBLICATIONS

CJ Vargas Martinez, "Evaluación del desempeño de nuevos agentes desemulsionantes base acrilico en aceites crudos mexicanos: sistema estático versus fuerza inducida" Instituto Mexicano del Petróleo, 2020 (1-5 pages).

EB Zamora Guerrero "Deshidratación y desalado de aceites crudos: relación estructura-actividad" Instituto Mexicano del Petróleo Programa Institucional de Posgrado, 2022 (1-8 pages).

EB Zamora Guerrero "Sintesis, caracterización y evaluación como agentes deshidratantes de petróleo de erpolímeros acrílicos" Instituto Mexicano del Petróleo, 2018, (1-335 pages).

EB Zamora Guerrero "Sintesis, caracterización y evaluación como agentes deshidratantes de petróleo de erpolímeros acrílicos" Instituto Mexicano del Petróleo, 2018, (1-6 pages).

Flores, César A., et al. "Anion and cation effects of ionic liquids and ammonium salts evaluated as dehydrating agents for super-heavy crude oil: Experimental and theoretical points of view." Journal of Molecular Liquids 196 (2014): 249-257.

Fuentes, Jessica V., et al. "A critical evaluation of novel demulsifying agents based on acrylic terpolymers for Mexican heavy crude oils dehydration." Separation and Purification Technology 281 (2022): 119878.

Fuentes, Jessica V., et al. "Dehydrating heavy crude oils with new amphoteric block bipolymers." Energy & Fuels 34.4 (2020): 4307-4317.

Spiecker, P. Matthew, Keith L. Gawrys, and Peter K. Kilpatrick. "Aggregation and solubility behavior of asphaltenes and their subfractions." Journal of colloid and interface science 267.1 (2003): 178-193.

Zaman, Hira, et al. "Magnetically recoverable poly (methyl methacrylate-acrylic acid)/iron oxide magnetic composites nanomaterials with hydrophilic wettability for efficient oil-water separation." Journal of Environmental Management 319 (2022): 115690.

* cited by examiner

RANDOM ACRYLIC TERPOLYMERS OF CONTROLLED MOLECULAR MASS EMPLOYED IN THE DESTABILIZATION OF W/O SIMPLE AND/OR O/W/O COMPLEX EMULSIONS IN CRUDE OILS

CROSS-REFERENCE TO RELATED APPLICATIONS

This patent application claims priority under 35 U.S.C. Section 119 to Mexican Patent Application No. MX/a/2023/009450, filed Aug. 11, 2023, the entire disclosure of which is incorporated herein by reference.

FIELD

The present disclosure belongs to the field of chemical products for petroleum conditioning, in particular to the field of demulsifying agents. More specifically, it concerns the application of random terpolymers based on alkyl acrylate-ethylene alkanoate-alkoxyalkyl acrylate to destabilize simple emulsions of the water-in-crude oil (W/O) type and/or complex emulsions of the crude oil-in-water-in-crude oil (O/W/O) type present in crude oils with gravities from 6 to 40° API, to remove the emulsified water and salts dissolved in the later. Its application is mainly focused on wells—to avoid formation damage caused by emulsions, in offshore units, triphasic separation units, and in onshore units prior to the refining process.

BACKGROUND OF THE DISCLOSURE

The presence of water during the extraction process of crude oil—light, heavy and extra-heavy—is something inevitable. Currently, an augmentation of the water content in the extracted crude oil has been observed; wherein the water is found as an emulsion, added to this, there is the presence of a high content of salts dissolved in the emulsified water and dispersed in the crude oil as crystals. Unfortunately, the presence of emulsified water brings on problems of formation damages in the wells, whereas in later stages, corrosion problems arise in equipments and pipes. In addition, because of the increase in the viscosity of the emulsified crude oil, the crude oil transportation from the well to the refining stage becomes extremely difficult, which entails a high demand on the pumping system.

Regarding the emulsions present in crude oil, these could be of the simple—water-in crude oil, W/O—type, or complex—crude oil-in-water-in crude oil, O/W/O—type. Both emulsions display a high physical stability because of the natural surfactants present in the crude oil, specifically, the asphaltenes and resins, which provoke the stabilization of the water-in-crude oil interface. This effect is due to, mainly, that a polar fragment of a resin interacts with a polar center of an asphaltene, thus, forming aggregates of solvated asphaltene fragments with resin fragments [1]. These asphaltenes and resins aggregates are adsorbed in the interface of the water droplets, generating a rigid structure that covers these ones, therefore, the system becomes highly stable, making it impossible, at this moment, the emulsified-water droplets coalescence. Obviously, the stability of the emulsion is related to the weight content of the asphaltenes and resins fractions; hence, the emulsions are more stable in heavy and extra-heavy crude, due to the high weight content of the asphaltenes and resins fractions.

Another important point to mention is that the W/O and/or O/W/O emulsions are not only found with a size of micrometers, but currently, it is quite common to observe water droplets with nanometer size, which makes the dehydration process more difficult.

On the basis of what has been described above, it is extremely important to completely remove the emulsified water or, at least, to achieve a reduction in its content to a value not greater than 0.50 vol %—maximum permissible value for issues of crude oil export.

In this sense, ionic liquids (IL's) have shown to be excellent demulsifying agents of crude oil at laboratory level. However, their high production cost makes unfeasible to be applied at industrial level. Flores et al. showed that the cation and anion type, that make up the IL, have a great influence on the performance of an IL in the crude oil dehydration process [2].

On the other hand, there are three main families of basic demulsifiers at industrial level: (1) triblock bipolymers of ethylene oxide (EO)/propylene oxide (PO)—POE-PPO-PEO—, (2) ethoxylated phenolic resins (EPR) and (3) ethoxylated nonyl phenols (ENP). It is important to note that a single basic from any of these three families does not have the required three properties in a demulsifying agent—breaker, coalescer and clarifier—. Therefore, in order to overcome this drawback, formulations must be prepared including at least three basics—each basic with a different number average molecular mass—of the same family or combination thereof, to obtain a demulsifying agent with the required characteristics. Evidently, this action implies several drawbacks: (1) PEO-PPO-PEO are synthesized in two stages, both a high temperature and pressure; (2) the ethoxylation of EPR and ENP is carried out at high temperature and pressure; (3) there is a shortage of ethylene oxide, which has an important impact on the final cost of each basic; and (4) the basics that make up the formulation present low chemical stability in acid media because of the protonation of the terminal hydroxyl groups, which are eliminate forming a terminal double bond, rendering the molecule ineffective for dehydrating crude oil.

To resolve the problem of chemical stability, in the specific case of the PEO-PPO-PEO triblock bipolymers, these have been functionalized with secondary amines—forming a terminal tertiary amine [3-5]—and with tertiary amine—forming an terminal alkyl ammonium salt, fragment that mimics to an ionic liquid [4, 5]—. In the case of triblock bipolymers with a termina Itertiary amine, the functionalization of the nitrogen atom has been carried out with an acrylic derivate by means of the aza-Michael reaction, in order to obtain a terminal amphotericfragment—protonated nitrogen atom—, which mimics an ionic liquid [6-8]. The amphoteric triblock bipolymers showed excellent performance in the removal of emulsified water, however, these present the solely drawback of requiring an additional synthesis step; accordingly, its use should be evaluated in regard to a performance/cost evaluation.

In order to avoid the use of demulsifying agents based on polyethers—PEO-PPO-PEO, EPR and ENP—, the use of dehydrating agents with different chemistry, specifically, acrylic-based polymers, has been reported in the literature. In this sense, the US patent document [9] describes the employ of terpolymers based on alkyl acrylates and alkyl acrylamies as destabilizers of crude oil-in-water (O/W) emulsions, which were synthesized by micellar polymerization by free radicals. However, because of their solubility in water, these cannot be employed to destabilize emulsions of the water-in-crude oil (W/O) type or crude oil-in-water-in-crude oil (O/W/O) type. For this purpose, the use of random copolymers coming from oxyalkylation has been reported in the literature, which are reacted with vinyl monomers [9]. Nevertheless, the removal efficiencies are not described in the patent document.

Zama et al. reported the use of poly(methyl methacrylate-acrylic acid)/nanoparticles of an iron oxide magnetic composite (P(MMA-AA(/Fe$_3$O$_4$NPS)—hydrophilic and magnetically recoverable polymer— to remove the emulsion present in a heavy crude oil of 24.7° API with an asphaltene content of 7.2 wt % [10]. It is important to note that the emulsion was prepared using distilled water with water:crude oil weight ratios of 1:9, 2:8, 3:7, 4:6 and 5:5; as well as a mechanical agitation at 2000 rpm. The authors report that the emulsion is stable for a period of 24 h. P(MMA-AA)/Fe$_3$O$_4$NPS showed higher water removal efficiency than the hexylamine and ethylene oxide/propylene oxide block copolymer.

Regarding the random acrylic bipolymers—composed of a hydrophobic monomer and a hydrophilic monomer—, the usage of random bipolymers based on alkyl acrylic-carboxy acrylic [11-13], alkyl acrylic-amino acrylic [14-16]; ethylene alkanoate-acrylic [17, 18], alkyl acrylic-alkoxy acrylic [19], alkyl acrylic-hydroxy acrylic [20] has been described in the literature. The aforementioned random acrylic bipolymers are mainly distinguished in the employed hydrophilic monomer, which confers characteristic properties to each of the acrylic bipolymers in question. In all documents listed above, the excellent performance of these products to remove emulsions of the W/O type present in heavy or extra-heavy crude oil is highlighted, significantly exceeding the performance obtained when a commercial formulation based on polyethers is employed.

On the other hand, continuing with the line of acrylic polymers, with a specific focus on acrylic terpolymers, the usage of these for applications different to crude oil dehydration has been reported. In this sense, the Mexican patent document MX 338861 [21] and the U.S. Pat. No. 9,120,885 [22] protect the synthesis of acrylic homopolymers, copolymers and terpolymers and their evaluation as flow improvers for crude oils with gravities from 9 to 30° API. Regarding the terpolymers, these are based on alkyl acrylate-styrene-vinyl or cyanovinyl acetate; this is, two hydrophobic monomers and one hydrophilic monomer. The U.S. Pat. No. 10,982,031 [23] describes the synthesis of alkyl acrylate-based terpolymers—three hydrophobic monomers—, which have been used as antifoam agents for crude oils with gravities from 10 to 40° API.

With regard to acrylic terpolymers used in the removal of emulsified water, the usage of terpolymers based on hydrophobic monomer and two hydrophilic monomers of different chemical structure and different partition coefficient (Log P) have been described in the literature, being the combination of these hydrophilic monomers which provides different characteristics to the acrylic terpolymer with respect to acrylic bipolymers for the destabilization of emulsion of the water-in-oil (W/O) type or crude oil-in-water-in-crude oil (O/W/O) type. In the thesis work "Synthesis and evaluation of random acrylic terpolymers for the dehydration of extra-heavy crude oils" [24], "Evaluation of the performance of new acrylic-based demulsifying agents in Mexican crude oils: static system versus induced force" [25], "Synthesis, characterization and evaluation of acrylic copolymers and terpolymers as petroleum dehydrating agents" [26] and "Dehydration and desalting of crude oils: structure-activity relationship" [27] mention the use of random acrylic terpolymers for the removal of emulsified water in crude oils of different API gravity. However, no work mentions the chemical structures or proportions of the used monomers for the synthesis of the terpolymers, thus it is impossible to infer these.

In this context, the Mexican patent application document MX/a/2020/01051 [28] and the American patent application document US 20220106530 [29] describe the preparation of macromolecules based on alky acrylate-amino alkyl acrylate-alkoxy alkyl acrylate for the destabilization of emulsion of the water-in-crude oil (W/O) type present in crude oils with densities from 8 to 40° API. Number average molecular mass ($\overline{M}_n$) of the terpolymers are between 1000 and 450 000 g·mol$^{-1}$.

The Mexican patent application document MX/a/2020/002212 [30] and the American application document US 20210277314 [31] claim the use of random terpolymers base alkyl acrylic-amino acrylic-carboxy acrylic of controlled molecular mass as dehydrating agents for crude oils with gravities from 3 to 40° API. The acrylic terpolymers displayed a better performance in the removal of emulsified water, surpassing the TOMAC (tri-n-octyl methyl ammonium chloride) ionic liquid and the FDH-1 commercial formulation, composed of four block terpolymer based on polyethers of different molecular mass. Number average molecular masses ($\overline{M}_n$) of the terpolymers are between 1200 and 664 200 g·mol$^{-1}$.

Fuentes et al. reported the synthesis of random terpolymers based on butyl acrylate (labeled as B)-2-(dimethylamino)ethyl acrylate (labeled as Ae)-2-carboxyethyl acrylate (labeled as Ce), where the weight ratio of the three monomers was varied, but always maintaining in greater proportion the B monomer [32]. The terpolymers were evaluated as demulsifying agents in crude oils with API gravities of 3.33°, 6.11° and 7.55°; and the performance was compared with the FDH-1 commercial formulation—based on polyethers— and with the F-46 TRETALITE™ product. The BAeCe-9551 and BAeCe-8111 terpolymers displayed the best performance in water removal at 80° C., surpassing the FDH-1 and F-46 products. In addition, the BAeCe-9551 product was evaluated in a heavy crude oil of 20.2° API at 60° C., showing a superior performance as a breaker, coalescer and clarifier of the removed water than the FDH-1 commercial formulation.

On the other hand, the Mexican patent application document MX/a/2022/008218 [33] seeks to protect the synthesis of novel random terpolymers based on alkyl acrylate-carboxyalkyl acrylate-alkoxyalkyl acrylate, as well as their use for the destabilization of water-in-crude oil (W/O) emulsions present in crude oils with gravities between 10 and 40° API. The novel BuCE random terpolymers presented a better performance in the removal of emulsified water than a commercial formulation based on polyethers and the F-46 demulsifier.

Unlike to the aforementioned documents, the present disclosure relates to novel random terpolymers based on alkyl acrylate (K)-ethylene alkanoate (M)-alkoxyalkyl acrylate (Z), process for their obtaining and their usage as destabilizing agents for W/O and/or O/W/O emulsions present in crude oils of different API gravity—from 6 to 40° API—. The three monomers that make up the random terpolymer make it as trifunctional molecule—breaker of water-in-crude oil (W/O) emulsion and/or crude oil-in-water-in-crude oil (O/W/O) emulsion, coalescer of emulsified water droplets and clarifier of the removed aqueous phase—.

The synthesis of the random acrylic terpolymers of the present disclosure used as destabilizers of W/O and/or O/W/O emulsions present in crude oils, is carried out by means of the semi-continuous emulsion polymerization process, under monomer starved feed conditions, based on the procedure developed at the Mexican Petroleum Institute, described in the patent documents MX 338861 B [21], U.S. Pat. No. 9,120,885 [22], MX 378417 [34], MX 383630 [35], U.S. Pat. No. 10,213,708 [36], U.S. Pat. No. 10,221,349 [37] and U.S. Pat. No. 10,982,031 [23]. It is important to mention that modification in the synthesis process were carried out with respect to what was reported in the aforementioned documents, which will be described later in this document. The random distribution of the acrylic-based terpolymers of the present disclosure is ensured, as mentioned, by feeding the reactants under monomer starved feed conditions. It should be mentioned that the hydrophobic monomer—alkyl acrylate (K)—must be always present in a higher weight percentage with respect to the hydrophilic monomers. This is because the hydrophobic monomer confers to the random acrylic terpolymer a high solubility in the organic phase—crude oil—, and, accordingly, it is impossible to be dragged by the removed aqueous phase. Because of their chemical structure the random acrylic terpolymers of the present disclosure are resistant to acid media, conditions that occur during periodic operations of acid stimulation of wells to increase the crude oil production. Finally, it is very important to mention that a single basic of acrylic terpolymer based alkyl acrylate-ethylene alkanoate-alkocyalkyl acrylate has the three characteristics required in a demulsifying agent—breaker, coalescer and clarifier—, which impacts in the cost-benefit issue, contrary to what is observed in commercial demulsifiers based on polyethers, since these must be dosed as a formulation of at least three basics of different average molecular weight.

Therefore, a first object of the present disclosure is based on modifications in the synthesis process by means of emulsion polymerization, in a semi-continuous reactor, to obtain random terpolymers based on alkyl acrylate-ethylene alkanoate-alkoxyalkyl acrylate, which mainly implies, the total conversion of monomers, together with a high randomness of the polymeric chains, which confers to the terpolymer a high performance as demulsifying agent of crude oil.

A second object of the present disclosure is the application of rand terpolymers based on alkyl acrylate-ethylene alkanoate-alkoxyalkyl acrylate as dehydrating agents of crude oil to destabilize simple (W/O) and/or complex (O/W/O) emulsions present in crude oils with API gravity in the range from 6 to 40° API.

The following references provide further background:
[1] P. M. Spiecker, K. L. Gawrys, P. K. Kilpatrick. Aggregation and solubility behavior of asphaltenes and their subfractions. J. Colloid. Interface Sci. 267 (2003) 178-193.
[2] C. A. Flores, E. A. Flores, E. Hernández, L. V. Castro, A. García, F. Alvarez, F. S. Vázquez. Anion and cation effects of ionic liquids and ammonium salts evaluated as dehydrating agents for super-heavy crude oil: Experimental and theoretical points of view. J. Mol. Liq. 196 (2014) 249-257.
[3] G. Cendejas-Santana, E. A. Flores-Oropeza, L. V. Castro-Sotelo, A. Estrada-Buendía, M. Lozada-y-Cassou, F. S. Vázquez-Moreno. Demulsifying and dehydrating formulations for heavy crude oils based on block copolymers bifunctionalized with amines. U.S. Pat. No. 8,815,960 B2. Aug. 26, 2014.
[4] C. A. Flores-Sandoval, E. A. Flores-Oropeza, A. López Ortega, J. G. Hernández Cortéz, A. Estrada-Buendía, L. V. Castro-Sotelo, R. Reyes Martínez, F. Álvarez Ramírez, A. Estrada Martínez, F. S. Vázquez-Moreno. Scale-up process of bifunctionalized triblock copolymers with secondary and tertiary amines, with application in dewatering and desalting of heavy crude oils. Canadian patent CA 2 852 863 C. Nov. 8, 2016.
[5] C. A. Flores-Sandoval, E. A. Flores-Oropeza, A. López Ortega, J. G. Hernández Cortéz, A. Estrada-Buendía, L. V. Castro-Sotelo, R. Reyes Martínez, F. Álvarez Ramírez, A. Estrada Martínez, F. S. Vázquez-Moreno. Scale-up process of bifunctionalized triblock copolymers with secondary and tertiary amines, with application in dewatering and desalting of heavy crude oils. U.S. Pat. No. 10,125,226 B2. Nov. 13, 2018.
[6] J. V. Fuentes-Santiago, E. B. Zamora-Guerrero, F. Álvarez-Ramírez, G. Zavala-Olivares, A. López-Ortega, F. S. Vázquez-Moreno, C. A. Flores-Sandoval. Bipolímeros tribloques POE-POP-POE, con terminaciones anfotéricas, como agentes desemulsionantes de aceites crudos pesados. Mexican application patent MX/a/2019/005132. May 2, 2019.
[7] C. A. Flores-Sandoval, F. S. Vázquez-Moreno, A. López-Ortega, F. Álvarez-Ramírez, G. Zavala-Olivares, J. V. Fuentes-Santiago, E. B. Zamora-Guerrero. PEO-PPO-PEO triblock bipolymers, with amphoteric endings, as demulsifying agents for heavy crude oils. U.S. Pat. No. 11,261,282 B2. Mar. 1, 2022.
[8] J. V. Fuentes, E. B. Zamora, R. Mariath, Z. Li, X. Zhenghe, F. Vázquez, C. A. Flores, Dehydrating heavy crude oils with new amphoteric block bipolymers. Energy Fuels 2020, 34, 4307-4317.
[9] D. Jacques, J. Bock, P. L. Valint. Oil-in-water emulsion breaking with hydrophobically functionalized cationic polymers. U.S. Pat. No. 4,741,835. My. 3, 1988.
[10] H. Zaman, A. H. A. Shah, N. Ali, C. Zhou, A. Khan, F. Ali, C. T. Tian, M. Bilal.
Magnetically recoverable poly (methyl methacrylate-acrylic acid)/iron oxide magnetic composites nanomaterials with hydrophilic wettability for efficient oil-water separation. J. Environ. Manage. 2022, 319, 115690.
[11] A. López-Ortega, C. A. Flores-Sandoval, E. B. Zamora-Guerrero, F. Álvarez-Ramírez, F. S. Vázquez-Moreno, G. Zavala-Olivares, M. A. Chávez-Mora. Removedores de emulsiones agua/aceite crudo con base en copolímeros aleatorios alquilacrílico-carboxialquilacrílico de masa molecular controlada. Mexican application patent MX/a/2018/002971. Mar. 9, 2018.
[12] C. A. Flores-Sandoval, C. A., M. A. Chávez-Mora, E. B. Zamora-Guerrero, A. López-Ortega., G. Zavala-Olivares, F. Álvarez-Ramírez, F. S. Vázquez-Moreno. Water/crude oil removers based on alkylacrylic-carboxyalkylacrylic random copolymers of controlled molecular mass. U.S. Pat. No. 10,793,783 B2. Oct. 6, 2020.
[13] C. A. Flores-Sandoval, M. A. Chávez-Mora, E. B. Zamora-Guerrero, A. López-Ortega., G. Zavala-Olivares, F. Álvarez-Ramírez, F. S. Vázquez-Moreno. Water/crude oil removers based on alkylacrylic-carboxyalkylacrylic random copolymers of controlled molecular mass. Canadian patent 3 013 494 C. Dic. 08, 2020.
[14] E. I. Hernández-Carbajal, C. A. Flores-Sandoval, F. Álvarez-Ramírez, A. López-Ortega, R. J. Garcia-Jiménez, G. Zavala-Olivares. Desemulsionantes para aceites crudos con base en copolímeros aleatorios acrílico-aminoacrílico de masa molecular controlada. Mexican patent MX 386485. Sep. 15, 2021.
[15] E. I. Hernández-Carbajal, C. A. Flores-Sandoval, F. Álvarez-Ramirez, A. López-Ortega, R. J. García-Jiménez, G. Zavala-Olivares, J. C. Clavel-López, F. S. Vázquez-Moreno. Demulsifiers for crude oil based on acrylic-aminoacrylic random copolymers of controlled molecular mass. U.S. Pat. No. 10,975,185 B2. Apr. 13, 2021.

[16] E. I. Hernández-Carbajal, C. A. Flores-Sandoval, F. Álvarez-Ramírez, A. López-Ortega, R. J. García-Jiménez, G. Zavala-Olivares, J. C. Clavel-López, F. S. Vázquez-Moreno. Demulsifiers for crude oil based on acrylic-aminoacrylic random copolymers of controlled molecular mass. Canadian patent CA 2 987 447 C. Aug. 10, 2021.

[17] C. J. Vargas-Martínez, C. A. Flores-Sandoval, E. B. Zamora-Guerrero, E. Cevada-Maya, E. Gómez-Buendía, F. Álvarez-Ramírez, F. S. Vázquez-Moreno, G. Zavala-Olivares, Jessica V. Fuentes-Santiago. Bipolimeros de adición con alta aleatoridad para desestabilización de emulsiones complejas en mezclas de aceites crudos. Mexican application patent MX/a/2020/011505. Oct. 29, 2020.

[18] C. A. Flores-Sandoval, F. S. Vázquez-Moreno, F. Alvarez-Ramírez, G. Zavala-Olivares, E. Gomez-Buendia, E. Cevada-Maya, J. V. Fuentes-Santiago, E. B. Zamora-Guerrero, C. J. Vargas-Martínez. Highly random addition bipolymers for destabilization of complex emulsions in crude oil blends. American application patent US 20220135886. May 5, 2022.

[19] C. A. Flores-Sandoval, F. S. Vázquez-Moreno, G. Zavala-Olivares, J. V. Fuentes-Santiago, E. B. Zamora-Guerrero, E. Cevada-Maya. Remoción de emulsiones agua-en-aceite crudo empleando macromoléculas de acrilatos hidrofóbicos e hidrofílicos. Mexican application patent MX/a/2021/008781. Jul. 21, 2021.

[20] C. A. Flores-Sandoval, F. S. Vázquez-Moreno, G. Zavala-Olivares, F. Álvarez-Ramírez, J. V. Fuentes-Santiago, E. B. Zamora-Guerrero, E. Cevada-Maya. Bipolímeros aleatorios de masa molecular controlada, base hidroxiacrílicos empleados como desestabilizadores de emulsiones agua/aceite, presentes en aceites crudos. Mexican application patent MX/a/2022/005169. Apr. 28, 2022.

[21] M. Lozada-y-Cassou, E. A. Flores-Oropeza, G. Cendejas-Santana, L. V. Castro-Sotelo, F. S. Vázquez-Moreno. Formulación de polímeros aleatorios para mejorar flujo de crudos del petróleo. Mexican patent MX 338861. Apr. 28, 2016.

[22] L. V. Castro-Sotelo, E. A. Flores-Oropeza, G. Cendejas Santana, M. Lozada-y-Cassou, F. S. Vázquez Moreno. Formulations of random polymers for improving crude petroleum flow. U.S. Pat. No. 9,120,885. Sep. 1, 2015,

[23] E. I. Hernández-Carbajal, A. López-Ortega, C. A. Flores-Sandoval, F. Álvarez-Ramírez, J. C. Clavel-López, F. S. Vázquez-Moreno, E. Cevada-Maya. Formulation of terpolymers based on alkyl acrylates employed as antifoaming of gasified heavy and super-heavy crude oils. U.S. Pat. No. 10,982,031 B2. Apr. 20, 2021.

[24] C. J. Vargas-Martínez. Chemical Engineering thesis, Universidad Veracruzana (UV). Facultad de Ciencias Químicas. Síntesis y evaluación de terpolimeros acrílicos aleatorios para el deshidratado de aceites crudos extra-pesados. Págs. 39-43. January, 2018.

[25] C. J. Vargas-Martínez. Master in Science thesis. Mexican Petroleum Institute (IMP). Evaluación del desempeño de nuevos agentes desemulsionantes base acrílico en aceites crudos mexicanos: sistema estático versus fuerza inducida. Págs. 48-51. June 2020.

[26] E. B. Zamora-Guerrero. Master in Science thesis. Mexican Petroleum Institute (IMP). Síntesis, caracterización y evaluación como agentes deshidratantes de petróleo de copolímeros y terpolímeros acrílicos. Págs. 82-86. August 2018. [27] E. B. Zamora-Guerrero. PhD in Engineering thesis. Mexican Petroleum Institute (IMP). Deshidratación y desalado de aceites crudos: relación estructura-actividad. Págs. 43-49. August 2022.

[28] C. J. Vargas-Martínez, C. A. Flores-Sandoval, E. B. Zamora-Guerrero, E. Cevada-Maya, E. Gómez-Buendia, F. Álvarez-Ramírez, F. S. Vázquez-Moreno, G. Zavala-Olivares, J. V Fuentes-Santiago. Nuevas macromoléculas alquiladas, aminadas y alcoxiladas con propiedades trifuncionales integradas para la remoción de emulsiones de petroleo. Mexican application patent MX/a/2020/01051. Oct. 5, 2020.

[29] C. A. Flores-Sandoval, F. S. Vázquez-Moreno, F. Álvarez-Ramírez, G. Zavala-Olivares, C. J.-Vargas Martínez, J. V. Fuentes-Santiago, E. B. Zamora-Guerrero, E. Cevada-Maya, E. Gómez-Buendía. Novel alkylated, aminated and alkoxylated macromolecules with integrated trifunctional properties for the removal of petroleum emulsions. American application patent US 20220106530 A1. Apr. 7, 2022.

[30] C. J. Vargas-Martínez, C. A. Flores-Sandoval, E. B. Zamora-Guerrero, F. Álvarez-Ramírez, F. S. Vázquez-Moreno, G. Zavala-Olivares, J. V. Fuentes-Santiago. Desemulsionantes para aceite crudo con base en terpolímeros aleatorios alquilacrílico-aminoacrílico-carboxiacrílico de masa molecular controlada. Mexican application patent MX/a/2020/002212. Feb. 27, 2020.

[31] C. A. Flores-Sandoval, F. S. Vázquez-Moreno, F. Álvarez-Ramírez, G. Zavala-Olivares, J. V. Fuentes-Santiago, E. B. Zamora-Guerrero, C. J. Vargas-Martinez. Demulsifying agents for crude oil based on random alkylacrylic-aminoalkylacrylic-carboxyalkylacrylic terpolymers of controlled molecular mass. American application patent US 20210277314 A1. Sep. 9, 2021.

[32] J. V. Fuentes, E. B. Zamora, A. Chakraborty, G. Zavala, Z. Xu, W. McCaffrey, Z. Li, F. Vázquez, C. A. Flores. A critical evaluation of novel demulsifying agents based on acrylic terpolymers for Mexican heavy crude oils dehydration. Sep. Purif. Technol. 281 (2022) 119878.

[33] C. A. Flores-Sandoval, F. S. Vázquez-Moreno, G. Zavala-Olivares, F. Álvarez-Ramírez, E. B. Zamora-Guerrero, J. V. Fuentes-Santiago, C. J. Vargas-Martínez, G. N Rodríguez-Araujo, E. Cevada-Maya. Terpolímeros acrílicos aleatorios de masa molecular controlada empleados como desestabilizadores de agua en aceite crudo. Mexican application patent MX/a/2022/008218. Jun. 30, 2022.

[34] E. Cevada-Maya, L. V. Castro-Sotelo, E. I. Hernández-Carbajal, C. A. Flores-Sandoval, A. López-Ortega, A. Estrada-Buendía, F. Álvarez-Ramírez, A. Estrada-Martínez, F. S. Vázquez-Moreno. Formulaciones de homopolimeros base acrilatos de alquilo empleadas como antiespumantes en aceites crudos pesados y súper pesados. Mexican patent MX 378417. Dic. 14, 2020.

[35] E. I. Hernández-Carbajal, E. Cevada-Maya, A. López-Ortea, C. A. Flores-Sandoval, F. Álvarez-Ramírez, A. Estrada-Martínez, F. S. Vázquez-Moreno. Formulaciones de copolímeros base acrilatos de alquilo empleados como antiespumantes en aceites crudos pesados y super-pesados. Mexican patent MX 383630. Jun. 8, 2021.

[36] E. Cevada-Maya, L. V. Castro-Sotelo, E. I. Hernández-Carbajal, C. A. Flores-Sandoval, A. López-Ortega, A. Estrada-Buendía, F. Álvarez-Ramírez, A. Estrada-Martinez, F. S. Vázquez-Moreno. Formulations of homopolymers based on alkyl acrylates as antifoaming agents in heavy and super-heavy crude oils. U.S. Pat. No. 10,213,708. Feb. 26, 2019.

[37] E. I. Hernández-Carbajal, E. Cevada-Maya, A. López-Ortea, C. A. Flores-Sandoval, F. Álvarez-Ramírez, A. Estrada-Martínez, F. S. Vázquez-Moreno. Formulations of copolymers based on alkyl acrylates used as defoamers of heavy and super-heavy crude oil. U.S. Pat. No. 10,221,349 B2. Mar. 5, 2019.

SUMMARY OF THE DISCLOSURE

The present disclosure concerns novel random terpolymers based on alkyl acrylate-ethylene alkanoate-alkoxyalkyl acrylate to destabilize simple emulsions of the water-in-crude oil (W/O) type and/or complex emulsion of the y crude oil-in-water-in-crude oil (O/W/O) type, in order to remove the emulsified water and the salts dissolved in it, specifically in direct applications in wells—to avoid the formation damage by emulsions—, in offshore units—triphasic separator units—and in onshore units—prior to the refining process—, for crude oils with gravities from 6 to 40° API.

To obtain these novel acrylic-based demulsifiers agents, the emulsion polymerization procedure was modified, always maintaining the premise of dosing under monomers starved feed conditions and a controlled dosing of the initiator.

The performance of the terpolymers as demulsifying agents displays excellent properties to provoke the destabilization of the water/crude oil interface, inducing the coalescence of the water droplets and with an excellent clarification of the removed water, clearly surpassing to the commercial formulations.

In one aspect, the present disclosure provides a random terpolymer based on alkyl acrylate-ethylene alkanoate-alkoxyalkyl acrylate as a dehydrating agent of crude oil, which includes a structural formula of molecular masses between 1,150 and 994,000 g·mol$^{-1}$ as follows:
where:

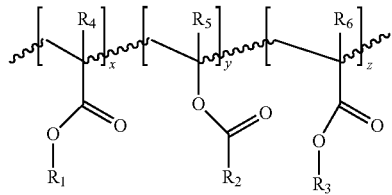

$R_1$, $R_2$, $R_3$, $R_4$, $R_5$ and $R_6$ are independent radicals represented by the following groups:

$R_1$=$CH_3$ (methyl), $C_2H_5$ (ethyl), $C_4H_9$ (n-butyl), $C_4H_9$ (iso-butyl), $C_4H_9$ (tert-butyl), $C_5H_{11}$ (pentyl), $C_6H_{13}$ (n-hexyl), $C_6H_{11}$ (di(ethylene glycol)ethylether), $C_8H_{17}$ (2-ethylhexyl), $C_9H_{19}$ (3,5,5-trimethylhexyl), $C_8H_{17}$ (n-octyl), $C_8H_{17}$ (iso-octyl), $C_8H_9$ (ethylene glycol phenyl ether), $C_{10}H_{21}$ (n-decyl), $C_{10}H_{21}$ (iso-decyl), $C_{10}H_{19}$ (10-undecenyl), $C_{10}H_{19}$ (tert-butylcyclohexyl), $C_{12}H_{25}$ (n-dodecyl), $C_{18}H_{37}$ (n-octadecyl), $C_5H_9O$ (tetrahydrofurfuryl), $C_5H_9O$ (2-tetrahydropyranyl), $C_{13}H_{27}$ (tridecyl), or $C_{22}H_{45}$ (behenyl), and can include, in an aliphatic chain, at least one of heteroatoms of ether groups and benzene type aromatic rings or heteroatoms rings of ether groups;

$R_2$=$CH_3$ (methyl), $C_2H_5$ (ethyl), $C_3H_7$ (propyl), $C_4H_9$ (n-butyl), $(CH_3)_3C$ (t-butyl), $C_6H_5$ (phenyl), $C_8H_{17}$ (n-octyl), $C_9H_{19}$ (n-nonyl), $C_{11}H_{23}$ (undecyl), or $C_{17}H_{35}$ (octadecanyl);

$R_3$=$C_2H_5O$ (methoxymethyl), $C_3H_7O$ (2-methoxyethyl), $C_4H_9O$ (2-ethoxyethyl), $C_4H_9O$ (3-methoxipropyl), $C_5H_{11}O$ (3-ethoxypropyl), $C_5H_{11}O_2$ (2-(2-methoxyethoxi)ethyl), or $C_8H_9O$ (2-phenoxyethyl), wherein an alkylalkoxy fragment could include phenyls, alkyls of cyclic or branched chain from $C_1$ to $C_{20}$;

$R_4$ and $R_6$=H (hydrogen) and/or $CH_3$ (methyl); and $R_5$=H, $CH_3$ and/or CN;

wherein:

x=is a number set up from 4 to 1075;

y=is a number set up from 4 to 1075;

z=is a number set up from 4 to 1075; and x, y and z may optionally occur as random sequences.

In one embodiment, the random terpolymer includes a ratio of alkyl acrylate monomer in an amount in a range from about 55.00 and 99.50 wt %, ethylene alkanoate monomer in an amount in a range from about 0.25 to 44.75 wt % and alkoxyalkyl acrylate monomer in an amount in a range from about 0.25 and 44.75 wt %.

In one embodiment of the random terpolymer, the alkyl acrylate monomers are selected from the group consisting of methyl acrylate, ethyl acrylate, butyl acrylate, pentyl acrylate, iso-butyl acrylate, tert-butyl acrylate, hexyl acrylate, 2-ethylhexyl acrylate, 3,5,5-trimethylhexyl acrylate, 4-tert-butylcyclohexyl acrylate, octyl acrylate, iso-decyl acrylate, decyl acrylate, lauryl acrylate, tridecyl acrylate, octadecyl acrylate, behenyl acrylate, methyl methacrylate, ethyl methacrylate, butyl methacrylate, pentyl methacrylate, iso-butyl methacrylate, tert-butyl methacrylate, hexyl methacrylate, 2-ethylhexyl methacrylate, 3,5,5-trimethylhexyl methacrylate, 4-tert-butylcyclohexyl methacrylate, octyl methacrylate, iso-decyl methacrylate, decyl methacrylate, lauryl methacrylate, tridecyl methacrylate, octadecyl methacrylate, and behenyl methacrylate.

In one embodiment of the random terpolymer, the ethylene alkanoate monomers are selected from the group consisting of vinyl acetate, vinyl propanoate, vinyl butyrate, vinyl trimehtylacetate, vinyl pentanoate, vinyl benzoate, vinyl laureate, vinyl neononanoate, vinyl decanoate, vinyl octadecanoate, 1-methylvinyl acetate, and 1-cianovinyl acetate.

In one embodiment of the random terpolymer, the alkoxyalky acrylate monomers are selected from the group consisting of 2-methoxyethyl acrylate, 2-phenoxyethyl acrylate, di(ethylene glycol)ethyl ether acrylate, 2-methoxyethyl methacrylate, 2-phenoxyethyl methacrylate, di(ethylene glycol)ethyl ether methacrylate, 2-ethoxyethyl acrylate, 2-ethoxyethyl methacrylate, 2-butoxyethyl acrylate, 2-butoxyethyl methacrylate, 2-ethoxymethyl acrylate, and 2-ethoxymethyl methacrylate.

In one embodiment, the random terpolymer includes an initiator in a range from about 0.10 to 10.00 wt % in regard to total amount of monomers in a system.

In another aspect, the present disclosure provides a process of synthesizing random terpolymer based on alkyl acrylate-ethylene alkanoate-alkoxyalkyl acrylate according to the present disclosure. In one embodiment, this process involves:

(i) a semi-continuous polymerization process involving adding a pre-emulsion of monomers, under reagent starved feed conditions, from an addition tank, wherein the alkyl acrylate monomer is in an amount from about 55.00 and 99.50 wt %, the ethylene alkanoate monomer is in an amount from about 0.25 to 44.75 wt %, and the alkoxyalkyl acrylate monomer is in an amount from about 0.25 and 44.75 wt %;

(ii) a feed rate to a main reactor is in a range from about 0.0001 to 0.0025 g·mL min$^{-1}$;

(iii) addition of an initiator is from a second addition tank to the main reactor, in proportions ranging from about 0.10 to 10.00 wt %, in regard to the total amount of monomers, to have a constant formation of free radicals in the system;

(iv) the addition rate of the initiator to the main reactor is carried out in a range from about 0.0001 to 0.0040 g·mL min$^{-1}$; and (v) the temperature of the reactor is set in a range from about 45 to 95° C.

In another aspect, the present disclosure provides a method of using the random terpolymers based alkyl acrylate-ethylene alkanoate-alkoxyalkyl acrylate of the present disclosure as dehydrating agents of crude oil, where the concentration of the dry random acrylic terpolymer in the formulation is from 0.50 to 50.00%.

In one embodiment of this method, the dry random acrylic terpolymer is dissolved in solvents such as dichloromethane, methanol, ethanol, isopropanol, 2-butoxyethanol, 2-butoxyethane acetate, chloroform, benzene and its derivates, toluene, xylene, jet fuel and naphtha, individually or as a mixture.

In one embodiment of this method, the formulation is dosed to the crude oil at a concentration in a range from about 3 to 3000 ppm.

BRIEF DESCRIPTION OF THE DRAWINGS

With the intention of providing clarity in the description of random acrylic terpolymers of controlled molecular mass employed in the destabilization of simple (W/O) and/or complex (O/W/O) emulsions in crude oils and their process of obtaining, objects of the present disclosure, the drawings are mentioned, without limiting the scope of the present disclosure.

DETAILED DESCRIPTION

Figure 1:
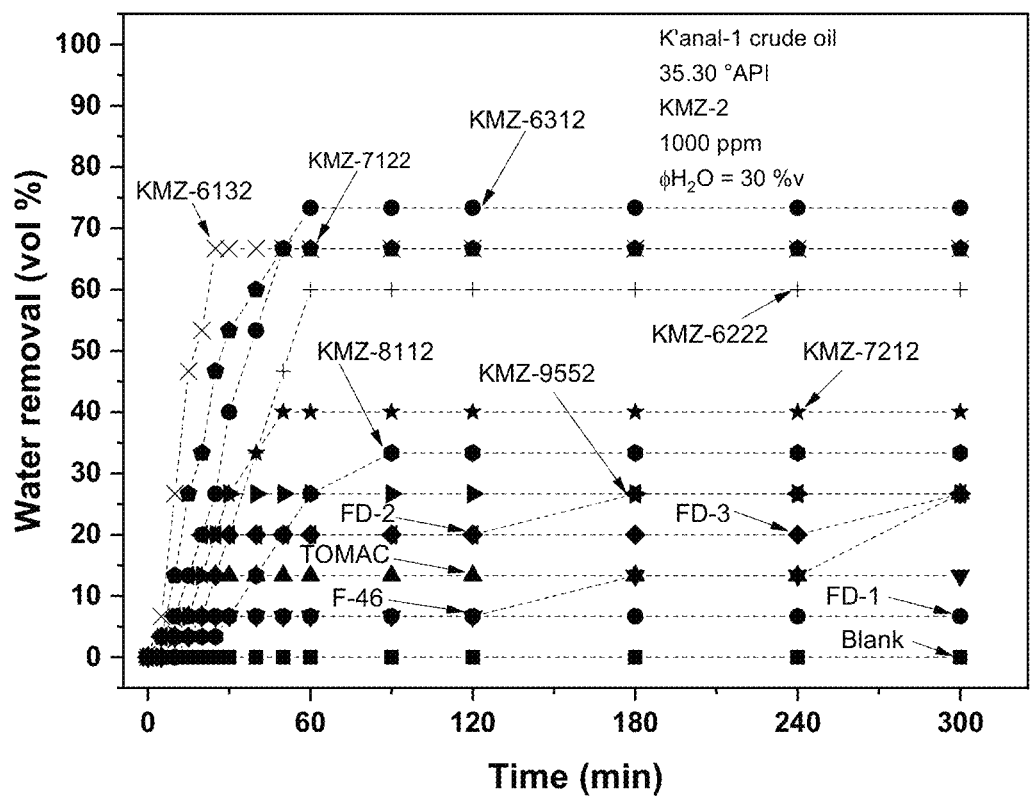
FIG. 1 present the water removal efficiency of the random terpolymers of the KMZ-2 series, based on alkyl acrylate-ethylene alkanoate-alkoxyalkyl acrylate—with different monomeric composition by weight—, the TOMAC ionic liquid, as well as the F-46, FD-1, FD-2 and FD-3 commercial formulations, which were evaluate in the K'anal-1 crude oil (35.30° API) at a dosage of 1000 ppm.

The present disclosure is related to novel random terpolymers based on alkyl acrylate-ethylene alkanoate-alkoxyalkyl acrylate, synthesis process for their obtaining and their usage as demulsifying agents of crude oil, specifically for the removal of simple emulsions of the water-in-crude oil (W/G) type and/or complex emulsion of the crude oil-in-water-in-crude oil (O/W/O) type.

The novel random terpolymers based on alkyl acrylate-ethylene alkanoate-alkoxyalkyl acrylate were synthesized in latex form by emulsion polymerization in a semi-continuous process, always maintaining a monomer starved feed conditions, to guarantee a high randomness in the synthesized polymer. Such synthesis procedure is widely described in the MX 338861 B [21], U.S. Pat. No. 9,120,885 [22], MX 378417 [34], MX 383630 [35], U.S. Pat. No. 10,213,708 [36], U.S. Pat. No. 10,221,349 [37] and U.S. Pat. No. 10,982,031 [23] patent documents. In all these patent documents only one addition tank is used to dose the pre-emulsion solution—monomers—to the main reactor; whereas the initiator is directly dosed to the main reactor, after having reached the reaction temperature—maintaining a constant agitation since the initial heating of the main reactor.

This synthesis procedure was employed to synthesize acrylic homopolymer, copolymers and terpolymers; however, in the present disclosure the following modifications were considered:

(1) Random acrylic terpolymers were synthesized in the form of latex with a solid content between 5.00 and 45.00 wt % of polymer.
(2) The addition of the monomers is carried out from the TA1 addition tank—tank containing the pre-emulsion solution— considering the following proportions: the alkyl acrylate (K) monomer is placed between 55.00 and 99.50 wt %, the ethylene alkanoate (M) monomer is in a range from 0.25 to 44.75 wt % and the alkoxyalkyl acrylate (Z) monomer is between 0.25 and 44.75 wt %.
(3) The addition rate of the TA1 tank to the main react is placed in the range from 0.0001 to 0.0025 g·mL min$^{-1}$.
(4) The initiator is added from the TA2 second-addition tank to the main reactor, in proportions ranging from 0.10 to 10.00 wt % with regard the total amount of monomers in the system. This is done in order to have a constant free radicals' formation in the system during the reaction time.
(5) The addition rate of the TA2 tank to the main reactor is selected in the range from 0.0001 to 0.0040 g·mL min$^{-1}$.
(6) The pre-emulsion and initiator must be simultaneously fed to the main reaction during the reaction time.
(7) The main reactor must be at a temperature between 45 and 95° C.; whereas the TA1 and TA2 addition tanks must be kept at room temperature.

Once the KMZ random acrylic terpolymer latex is obtained, this is subjected to a distillation process—in order to eliminate the employed water in the synthesis—at a temperature between 8° and 150° C., to finally obtain a viscous liquid, with a water content between 0.10 and 5.00 vol %. Subsequently, the dry polymer is dissolved in a suitable organic solvent such as dichloromethane, methanol, ethanol, isopropanol, 2-butoxyethanol, 2-butoxyethane acetate, chloroform, benzene and its derivates, toluene, xylene, jet fuel and naphtha; individually or as a mixture, for its final applications as a demulsifying agent in crude oils with gravities from 6 to 40° API. The concentration of the random acrylic terpolymer in solution could vary from 0.50 to 50.00 wt %, whereas the formulations are dosed in a concentration ranging from 3 to 3000 ppm.

Structure (1) represents the formula of random terpolymers based on alkyl acrylate-ethylene alkanoate-alkoxyalkyl acrylate, included in the present disclosure:

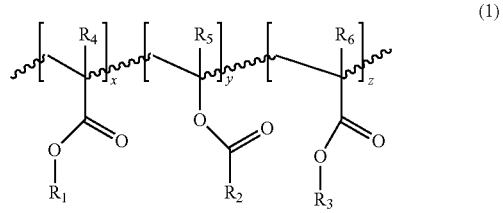

(1)

where:
$R_1$, $R_2$, $R_3$, $R_4$, $R_5$ and $R_6$ are independent radicals represented by the groups mentioned below:
$R_1$=$CH_3$ (methyl), $C_2H_5$ (ethyl), $C_4H_9$ (n-butyl), $C_4H_9$ (iso-butyl), $C_4H_9$ (tert-butyl), $C_5H_{11}$ (pentyl), $C_6H_{13}$ (n-hexyl), $C_6H_{11}$ (di(ethylene glycol)ethylether), $C_8H_{17}$ (2-ethylhexyl), $C_9H_{19}$ (3,5,5-trimethylhexyl), $C_8H_{17}$ (n-octyl), $C_8H_{17}$ (iso-octyl), $C_8H_9$ (ethylene glycol phenyl ether), $C_{10}H_{21}$ (n-decyl), $C_{10}H_{21}$ (iso-decyl), $C_{10}H_{19}$ (10-undecenyl), $C_{10}H_{19}$ (tert-butylcyclohexyl), $C_{12}H_{25}$ (n-dodecyl), $C_{18}H_{37}$ (n-octadecyl), $C_5H_9O$ (tetrahydrofurfuryl), $C_5H_9O$ (2-tetrahydropyranyl), $C_{13}H_{27}$ (tridecyl) or $C_{22}H_{45}$ (behenyl). This aliphatic chain can contain heteroatoms of the ether group, as well as benzene type aromatic rings or heteroatoms rings of the ether group.
$R_2$=$CH_3$ (methyl), $C_2H_5$ (ethyl), $C_3H_7$ (propyl), $C_4H_9$ (n-butyl), $(CH_3)_3C$ (t-butyl), $C_6H_5$ (phenyl), $C_8H_{17}$ (n-octyl), $C_9H_{19}$ (n-nonyl), $C_{11}H_{23}$ (undecyl), $C_{17}H_{35}$ (octadecanyl).
$R_3$=$C_2H_5O$ (methoxymethyl), $C_3H_7O$ (2-methoxyethyl), $C_4H_9O$ (2-ethoxyethyl), $C_4H_9O$ (3-methoxipropyl), $C_5H_{11}O$ (3-ethoxypropyl), $C_5H_{11}O_2$ (2-(2-methoxyethoxi)ethyl) or $C_8H_9O$ (2-phenoxyethyl). The alkylalkoxy fragment could include phenyls, alkyls of cyclic or branched chain from $C_1$ to $C_{20}$.
$R_4$ and $R_6$=H (hydrogen) or $CH_3$ (methyl).
$R_5$=H, $CH_3$ or CN.
Where also:
x=is a number set up from 4 to 1075;
y=is a number set up from 4 to 1075;
z=is a number set up from 4 to 1075; and
"x", "y" and "z" could be presented in random sequences.

The number average molecular masses ($\overline{M}_n$) of the random acrylic terpolymers is set up in an interval from 1,150 to 994,000 g·mol$^{-1}$.

The alkyl acrylate monomers selected for the synthesis of the random acrylic terpolymers object of the present disclosure are described, as way of example, which does not imply any limitation: methyl acrylate, ethyl acrylate, butyl acrylate, pentyl acrylate, iso-butyl acrylate, tert-butyl acrylate, hexyl acrylate, 2-ethylhexyl acrylate, 3,5,5-trimethylhexyl acrylate, 4-tert-butylcyclohexyl acrylate, octyl acrylate, iso-decyl acrylate, decyl acrylate, lauryl acrylate, tridecyl acrylate, octadecyl acrylate, behenyl acrylate, methyl methacrylate, ethyl methacrylate, butyl methacrylate, pentyl methacrylate, iso-butyl methacrylate, tert-butyl methacrylate, hexyl methacrylate, 2-ethylhexyl methacrylate, 3,5,5-trimethylhexyl methacrylate, 4-tert-butylcyclohexyl methacrylate, octyl methacrylate, iso-decyl methacrylate, decyl methacrylate, lauryl methacrylate, tridecyl methacrylate, octadecyl methacrylate and behenyl methacrylate.

On the other hand, the selected ethylene alkanoate monomers for the synthesis of the random acrylic terpolymers object of the present disclosure are listed: vinyl acetate, vinyl propanoate, vinyl butyrate, vinyl trimehtylacetate, vinyl pentanoate, vinyl benzoate, vinyl laureate, vinyl neononanoate, vinyl decanoate, vinyl octadecanoate, 1-methylvinyl acetate and 1-cianovinyl acetate.

Finally, the selected alkoxyalkyl acrylate monomers for the synthesis of the random acrylic terpolymers, object of the present disclosure are listed: 2-methoxyethyl acrylate, 2-phenoxyethyl acrylate, di(ethylene glycol)ethyl ether acrylate, 2-methoxyethyl methacrylate, 2-phenoxyethyl methacrylate, di(ethylene glycol)ethyl ether methacrylate, 2-ethoxyethyl acrylate, 2-ethoxyethyl methacrylate, 2-butoxyethyl acrylate, 2-butoxyethyl methacrylate, 2-ethoxymethyl acrylate and 2-ethoxymethyl methacrylate.

On the other hand, to induce the destabilization of the water/crude oil interface, followed by the coalescence process of water droplets and, finally, the elimination of the emulsified water present in crude oils with gravities from 6 to 40° API, the method includes adding an effective amount of the random terpolymers based on alkyl acrylate-ethylene alkanoate-alkoxyalkyl acrylate in solution to the crude oil to be evaluated, at a concentration ranging from 3 to 3000 ppm.

The present disclosure is described with reference to a specific number of examples, which are only considered as illustrative and, therefore, not restrictive of the present disclosure. Once the random terpolymers based on alkyl acrylate-ethylene alkanoate-alkoxyalkyl acrylate were obtained, these are characterized using the following instrumental methods:

1.—Size exclusion chromatography (SEC): in an Agilent™ model 1100 size exclusion chromatograph, with a PLgel column and using tetrahydrofuran (THF) as eluent, to calculate the average molecular masses distribution of the acrylic terpolymers, as well as the polydispersity index (I). The calibration of the equipment was carried out using three polystyrene standards from Polymer Laboratories: RED vial, $\overline{M}_W$=5 000 000, 325 000, 21 000 and 1270 g·mol$^{-1}$; BLUE vial, $\overline{M}_W$=1 950,000, 113 300, 7200 and 580 g·mol$^{-1}$; GREEN vial, $\overline{M}_W$=696 500, 50 400, 2960 and 162 g·mol$^{-1}$.

2.—Fourier transform infrared spectroscopy (FTIR): a Thermo Nicolet™ AVATAR 330 Fourier transform infrared spectrometer with the OMNIC™ 7.0 software was used, employing the film technique method. 64 scans were employed to acquire the spectrum in the transmission mode with a wavelength range from 400 to 4000 cm$^{-1}$.

3.—$^1$H and $^{13}$C Nuclear magnetic resonance (NMR): Bruker™ AVANCE NEO spectrometer, at a frequency of 600 MHz and 150 MHz, respectively, was employed to acquire the spectra. Approximately 150 mg of the dry polymer is dissolved in deuterated chloroform (CDCl$_3$)—dissolvent—, employing tetramethylsilane as reference (TMS). $^1$H and $^{13}$C pulse sequences are the implemented in the software.

4. Thermogravimetric analysis (TGA): the thermograms were obtained in a TA instruments TGA 2950 thermogravimetric analyzer. The sample was heated from room temperature to 500° C. with a heating rate of 5° C.·min$^{-1}$ and with a nitrogen flow of 10° C.·min$^{-1}$.

5. Particle size distributions (D$_z$): the particle size distribution of the polymer latex was obtained in an Anton Paar instrument, Litesizer™ 500 particle analyzer. A solution of 5 drops of latex in 2.5 mL of distilled water was prepared; subsequently, the refractive index value was determined using an Anton Paar instrument, Abbemat™ 300 automatic refractometer, value that was used in the Kalliope™ software to determine the particle diameter value.

Tables 1 and 2 show the weight ratio of the alkyl acrylate (K), ethylene alkanoate (M) and alkoxyalkyl acrylate (Z) monomers, latex particle diameter of the random terpolymers based on alky acrylate-ethylene alkanoate-alkoxyalkyl acrylate, number average molecular mass of the dry random terpolymer and the degradation temperature thereof. Table 1 displays the results for the poly(alky acrylate-ethylene alkanoate-alkoxyalkyl acrylate) (R$_1$=n-butyl, R$_2$=methyl, R$_3$=2-methoxyethyl, R$_4$, R$_5$ and R$_6$=hydrogen) corresponding to the KMZ-1 series, which does not mean any limitation.

Table 2 displays the results for the poly(alky acrylate-ethylene alkanoate-alkoxyalkyl acrylate) (R$_1$=n-butyl, R$_2$=methyl, R$_3$=2-methoxyethyl, R$_4$, R$_5$ and R$_6$=hydrogen) corresponding to the KMZ-4 series, which does not mean any limitation.

TABLE 1

Composition in wt % of the terpolymers based on allky acrylate-ethylene alkanoate-alkoxyalkyl acrylate of the KMZ-2 series and the latex particles diameter (D$_z$) del latex, as well as the number average molecular mass ($\overline{M}_n$) obtained by SEC and the thermal degradation - both of the dry polymer.

| Terpolymer | Weight ratio of the K, M and Z monomers (wt %) | D$_z$ (nm) | $\overline{M}_n$ (g · mol$^{-1}$) | Thermal degradation (° C.) |
|---|---|---|---|---|
| KMZ-9552 | 90/05/05 | 183.05 | 9636 | 293 |
| KMZ8112 | 80/10/10 | 66.18 | 8865 | 290 |
| KMZ-7212 | 70/20/10 | 215.05 | 9519 | 281 |
| KMZ-7122 | 70/10/20 | 83.28 | 11803 | 290 |
| KMZ-6312 | 60/30/10 | 58.73 | 8726 | 281 |
| KMZ-6222 | 60/20/20 | 97.65 | 9142 | 294 |
| KMZ-6132 | 60/10/30 | 153.37 | 12432 | 280 |

TABLE 2

Composition in wt % of the terpolymers based on allky acrylate-ethylene alkanoate-alkoxyalkyl acrylate of the KMZ-4 series and the latex particles diameter (D$_z$), as well as the number average molecular mass ($\overline{M}_n$) obtained by SEC and the thermal degradation - both of the dry polymer.

| Terpolymer | Weight ratio of the K, M and Z monomers (wt %) | D$_z$ (nm) | $\overline{M}_n$ (g · mol$^{-1}$) | Thermal degradation (° C.) |
|---|---|---|---|---|
| KMZ-9554 | 90/05/05 | 106.17 | 5121 | 290 |
| KMZ-8114 | 80/10/10 | 105.47 | 4651 | 293 |
| KMZ-7214 | 70/20/10 | 97.35 | 5673 | 302 |
| KMZ-7124 | 70/10/20 | 94.59 | 5293 | 297 |
| KMZ-6314 | 60/30/10 | 97.25 | 5594 | 290 |
| KMZ-6224 | 60/20/20 | 96.81 | 4538 | 290 |
| KMZ-6134 | 60/10/30 | 96.37 | 4675 | 300 |

Examples

The following examples are presented to illustrate the spectroscopic characteristic of the terpolymers based on alky acrylate-ethylene alkanoate-alkoxyalkyl acrylate employed as dehydrating agents of crude oils with gravities ranging from 6 to 40° API. These examples should not be considered as limiting to what is claimed here.

KMZ-2 and KMZ-4 Series

Random terpolymers based on alky acrylate-ethylene alkanoate-alkoxyalkyl acrylate:

IR. ν cm$^{-1}$: 3446, 2960, 2937, 2874, 1736, 1456, 1375, 1246, 1164, 1115 and 1062.

$^1$H NMR δ (ppm): 4.19, 4.03, 3.71, 3.65, 3.55, 3.35, 2.32, 2.27, 1.96, 1.90, 1.59, 1.36, 1.29, 1.27, 1.24, 0.94, 0.92, 0.91, 0.88 and 0.87.

$^{13}$C NMR δ (ppm): 174.6, 174.52, 174.45, 172.76, 170.10, 64.54, 64.42, 63.45, 63.29, 61.64, 58.46, 41.38, 40.25, 38.55, 37.37, 36.41, 36.04, 35.36, 35.15, 34.72, 32.53, 31.90, 31.73, 31.45, 29.62, 29.53, 29.33, 28.86, 22.96, 22.68, 20.85, 19.09, 14.12, 14.08 and 13.73.

Evaluation of Random Terpolymers Based on Alky Acrylate-Ethylene Alkanoate-Alkoxyalkyl Acrylate as Dehydrating Agents of Crude Oils with Gravities Ranging from 6 to 40° API.

In order to assess the water removal efficiency of the random terpolymers based on alky acrylate-ethylene alkanoate-alkoxyalkyl acrylate, solutions of each dry terpolymer were prepared—drying process at temperature from 80 to 150° C.—, in which the concentration of the dry terpolymer is between 0.50 and 50.00 wt %. Solvents such as dichloromethane, methanol, ethanol, isopropanol, 2-butoxyethanol, 2-butoxyethane acetate, chloroform, benzene, toluene, xylene, jet fuel and naphtha were used for its preparation. These are used individually or as mixtures, in such way, that small volumes of the solution are added, in order to eliminate possible effects related to the solvent, which could affect the performance of the terpolymers as demulsifying agents. The KMZ random acrylic terpolymers were evaluated in concentrations ranging from 3 to 3000 ppm, in conjunction with four commercial products widely used in the oil industry FD—1, FD-2, FD-3 and F-46 (employed at laboratory level in field evaluations)—and the TOMAC ionic laboratory (employed a laboratory level). Regarding the FD-1 commercial product, this corresponds to a formulation made up of four basics based on polyethers of different weight composition of propylene oxide/ethylene oxide (PO/EO) and different number average molecular mass. Table 3 lists the properties of the base polymeric polyethers that constitute the FD-1 commercial formulation. The main idea of having three basics—based on polyethers of different number molecular mass—is to confer to the formulation the required-three properties for a demulsifying agent—breaker, coalescer and clarifier—. About the FD-2 commercial formulation, this is composed of ethoxylated phenolic resin basics—with different degree of ethoxylation and, therefore, different number average molecular mass—whereas the FD-3 commercial formulation is composed of ethoxylated nonyl phenols basics—with different degree of ethoxylation and, hence, different number average molecular mass—. Regarding the F-46 demulsifying agent, this is composed of oxylakylated arylsufonate ethylene formaldehyde resin, also containing alcohols such as isopropanol and methanol, as well as alkali metal halides—NaCl or KCl—. This demulsifying agent is widely employed in the oil industry at laboratory level, mainly in evaluations in field, in order to determine the total water content.

Finally, the TOMAC ionic liquid (tri-n-octyl methyl ammonium chloride) is only employed in assessment at laboratory level, this is due to the excellent performance to remove the emulsified water; however, it has the major drawback of having a high production cost, accordingly, like the F-46 formulation, it cannot be employed at industrial level.

TABLE 3

Components of the FD-1 commercial formulation, including PO/EO composition in wt % and number average molecular mass ($\overline{M}_n$).
Formulation FD-1

| Labeled | PO/EO composition (wt %) | $\overline{M}_n$ (g · mol$^{-1}$) |
|---|---|---|
| TP 89 | 90/10 | 7750 |
| TP 03 | 70/30 | 5330 |
| TP 14 | 60/40 | 3050 |
| TP 71 | 90/10 | 1400 |

To carry out the performance assessment of the random terpolymers based on alky acrylate-ethylene alkanoate-alkoxyalkyl acrylate as demulsifying agents, as well as the commercial products, the following methodology was used: firstly, in 150 mL graduated oblong bottles, provided with insert and lid, the required aliquot of the solution of the random terpolymers based on alky acrylate-ethylene alkanoate-alkoxyalkyl acrylate was added, as well as the aliquot of the TOMAC ionic liquid and the aliquot of the FD-1, FD-2, FD-3 and F-46 commercial products. One more bottle without demulsifying agents was considered, which was labeled as blank. Subsequently, the bottles were dosed with crude oil up to the 100 mL mark. It is important to mention that the bottle was not shaken after dosing the crude oil, which avoids any alteration of the original emulsion. The amount of removed water in each bottle was measured, and afterwards, these were placed in a controlled-temperature thermal bath, employing an assessment interval from 25 to 90° C.

The breakdown of the water-in-crude oil and/or crude oil-in-water-in-crude oil emulsion were measured every 5 min during the first hour; subsequently, every half hour during the second hour and, finally, every hour during the rest of the evaluation time (5 h). Random acrylic terpolymers of the present disclosure and commercial products were evaluated at different concentrations ranging from 3 to 3000 ppm.

Table 4 lists the physicochemical characterization of the crude oils employed in the evaluation of the random terpolymers based on alkyl acrylate-ethylene alkanoate-alkoxyalkyl acrylate as dehydrating agents of crude oil of different API gravity—from 6 to 40° API—.

TABLE 4

Characteristics and physicochemical properties of the employed crude oils for the evaluation of the random acrylic terpolymers object of the present disclosure.

| Parameter | K'anal-1 | K'anal-2 | K'anal-3 | K'anal-4 |
|---|---|---|---|---|
| Gravity (°API) | 35.30 | 15.20 | 13.80 | 15.60 |
| Salt content (lb · mbb$^{-1}$) | 3287.00 | >150.00 | 8007.30 | >430.00 |
| Paraffins content (wt %) | 7.00 | 9.00 | 1.83 | 1.38 |
| Runoff temperature (° C.) | −27 | −33 | −27 | −3 |
| Water content by distillation (vol %) | 0.10 | 0.50 | 69.00 | 59.00 |
| Water and sediments (vol %) | 0.10 | 0.50 | 70.00 | 60.00 |
| Kinematic viscosity (mm$^2$ · s$^{-1}$) @ 25° C. | 4.70 | 335.5 | 362.0 | 4277.0 |
| Number average molecular mass by cryoscopy ($\overline{M}_n$)(g · mol$^{-1}$) | 224 | 375 | 447 | 412 |
| Saturates (wt %) | 38.06 | 51.53 | 33.45 | 25.66 |
| Aromatics (wt %) | 28.54 | 13.93 | 41.32 | 35.68 |
| Resins (wt %) | 30.22 | 19.50 | 15.74 | 25.66 |
| Asphaltenes (wt %) | 3.14 | 15.04 | 8.95 | 12.18 |

As demonstration, which does not imply any limitation, FIGS. 1, 3, 5, 7 and 9 show the results of the emulsified water removal efficiency as a function of time, whereas FIGS. 2, 4, 6, 8 and 10 display the optical micrographs of the treated crude oil with a demulsifying agent, as well as the images of the bottles, where the removed water/crude oil interface and the clarification of the removed water are observed.

FIG. 1 displays the performance of the random terpolymers based on alkyl acrylate-ethylene alkanoate-alkoxyalkyl acrylate of the KMZ-2 series in the K'anal-1 crude oil (35.30° API), dosage at 1000 ppm. As can be observed, the KMZ-6312 terpolymer presented a lower coalescence rate compared with the KMZ-6132 and KMZ-7122 terpolymers up to 40 min of the assessment; however, it exceeded the performance of these terpolymers at 60 min, achieving a water removal efficiency of 73 vol %. Although the KMZ-6132 acrylic terpolymer exhibited the best performance as coalescer, reaching a removal of 67 vol % of emulsified water at 25 min; after this time, the terpolymer was unable to induce the destabilization of the water/crude oil interface. In the case of the KMZ-7122 terpolymer, this displayed a coalescence rate slightly lower than that of the KMZ-6132 terpolymer, achieving a maximum water removal of 67 vol % at 50 min of assessment. The rest of the random acrylic terpolymers of the KMZ-2 series—KMZ-6222, KMZ-7212, KMZ-8112 and KMZ-9552—showed a lower performance in the removal of emulsified water, with efficiencies between 27 and 60 vol %. Regarding the FD-1, FD-2 and FD3 commercial formulations, as well as the F-46 commercial product and the TOMAC ionic liquid, these exhibited a low performance to destabilize the emulsion and, therefore, a low volume of removed water was obtained—6 and 27 vol %—. Finally, it can be observed that in the blank sample was not observed removed water due to the temperature effects, hence, the emulsion was highly stable during the assessment period.

Figure 2:
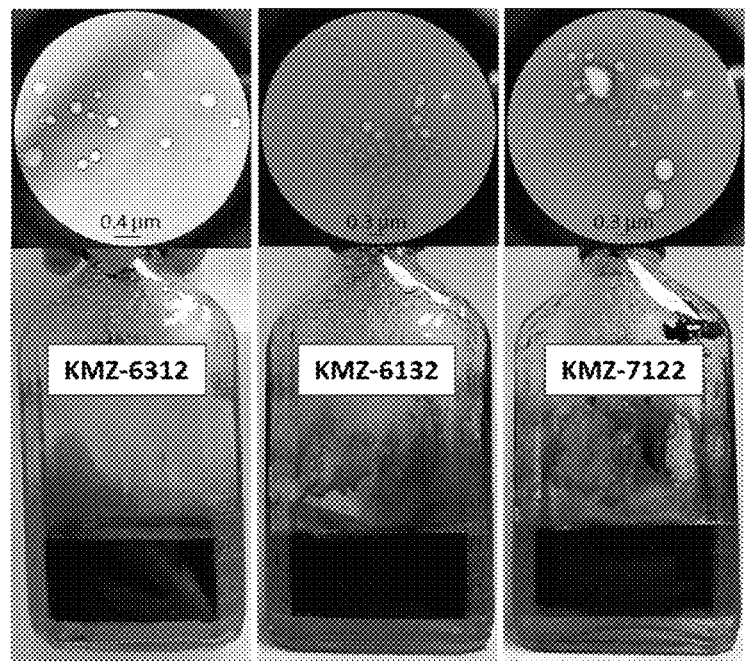
FIG. 2 shows the images of the optical micrographs and bottles of the K'anal-1 crude oil (35.30° API) after having been treated with the KMZ-6312—73 vol %—, KMZ6132—67 vol %—and KMZ-7122—67 vol %—random terpolymers based on alkyl acrylate-ethylene alkanoate-alkoxyalkyl acrylate, as well as the TOMAC—27 vol %—ionic liquid and the FD-2—27 vol %—and FD3—27 vol %—commercial formulations, at a dosage of 1000 ppm.
Figure 2:
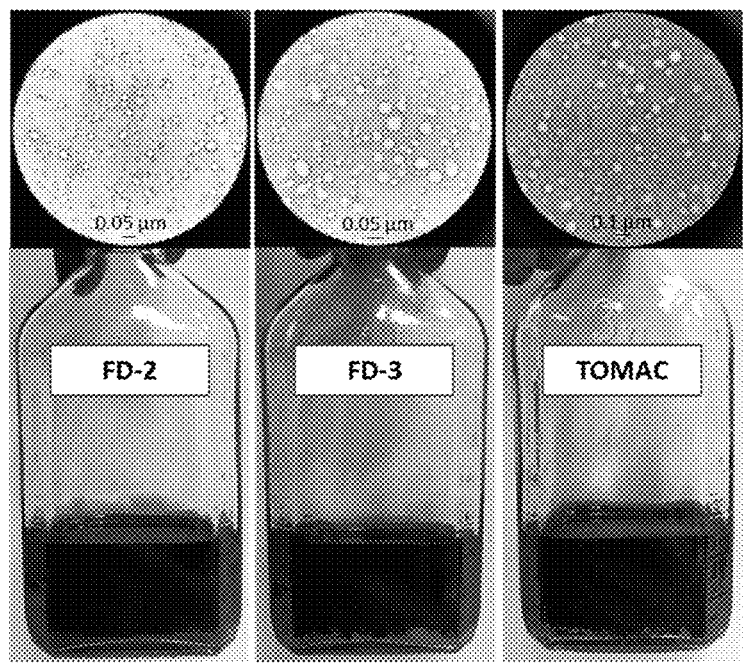

FIG. 2 presents the optical micrographs of the treated crude oil with the KMZ-6312, KMZ-6132 and KMZ-7122 terpolymers, where the presence of remaining water can be observed, with a polydisperse system in all three cases. In the micrograph of the treated crude oil with the KMZ-6312 terpolymer, water droplets are observed with a droplet diameter between 0.40 and 1.00 µm; whereas in the case of the KMZ-6132 and KMZ-7122 acrylic terpolymer, the droplet diameters are between 0.30 and 0.80 µm. In the case of the FD-2 and FD-3 commercial formulations—both with a removal efficiency of 27 vol %—, a polydisperse system is observed with a droplet size from 0.05 to 0.30 µm; this smaller droplet size, compared with the obtained employing the random acrylic terpolymers, is mainly due to their lower performance to induce the destabilization of the water/crude oil interface of smaller water droplets and, therefore, to promote the coalescence of the water droplets. In the optical micrograph of the TOMAC ionic liquid—27 vol %—, there is also a polydisperse system, but the water droplet size is between 0.10 and 0.40 µm. In this sense, the TOMAC ionic liquid present a better performance to destabilize the water/crude oil interface of the water droplets of smaller diameter in comparison with the FD-2 and FD-3 commercial products.

On the other hand, the KMZ-6312 acrylic terpolymers presents a homogeneous and well-defined interface, with a good clarification of the removed water—73 vol %—. In the case of the TOMAC ionic liquid, this presents a good water/crude oil interface, as well as a good performance in the clarification of the removed water, comparable to the KMZ-6312 terpolymer. On the contrary, in the FD-2 and FD-3 commercial products, the interface is not well-defined, coupled with the fact that these products show a low capacity to clarify the removed water.

Figure 3:
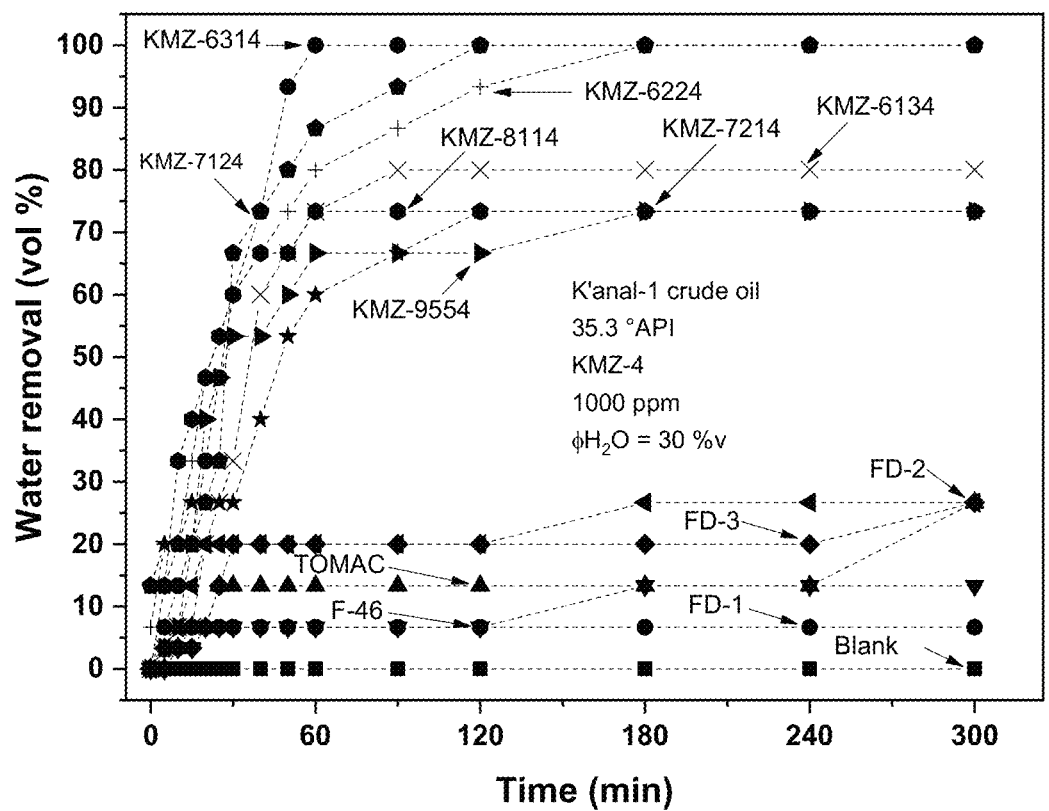
FIG. 3 displays the water removal efficiency of the random terpolymers based on alkyl acrylate-ethylene alkanoate-alkoxyalkyl acrylate with different monomeric composition of the KMZ-4 series, the TOMAC ionic liquid, as well as the F-46, FD-1, FD-2 and FD-3 commercial formulations, which were evaluated in the crudo K'anal-1 crude oil (35.30° API) at a dosage of 1000 ppm.

Random acrylic terpolymers of the KMZ-4 series were evaluated in the K'anal-1 crude oil (35.30° API) at a dosage of 1000 ppm (FIG. 3). Random acrylic terpolymers of the KMZ-4 series have a lower number average molecular mass ($\overline{M}_n$) that the terpolymers of the KMZ-2 series, which, as can be observed in FIG. 3, induces a better performance of the random acrylic terpolymers to destabilize the water/crude oil interface, and therefore, to remove a higher amount of the emulsified water. In this sense, the KMZ-6314 terpolymer managed to remove 100 vol % of the emulsified water at 60 min of assessment, whereas that the KMZ-7124 and KMZ-6224 terpolymers reached the same removal efficiency at 120 and 180 min, respectively. With a lower performance, the KMZ-6134 terpolymer removed 80 vol % of the emulsified water; whereas the rest of the terpolymers—KMZ-9554, KMZ-8114 and KMZ-7214—, although these presented different coalescence rate, all of them reached a maximum removal efficiency of 73 vol %. On the basis of the obtained results, it is evident the best performance of the random acrylic terpolymers of the KMZ-4 series in the K'anal-1 crude oil (35.30° API), being noticeably superior to the KMZ-2 series. Hence, the performance of the demulsifying agent increases with a low number average molecular mass in a light crude oil. Besides, any acrylic terpolymer of the KMZ-4 series significantly outperforms the performance of the commercial formulations and the TOMAC ionic liquid.

Figure 4:
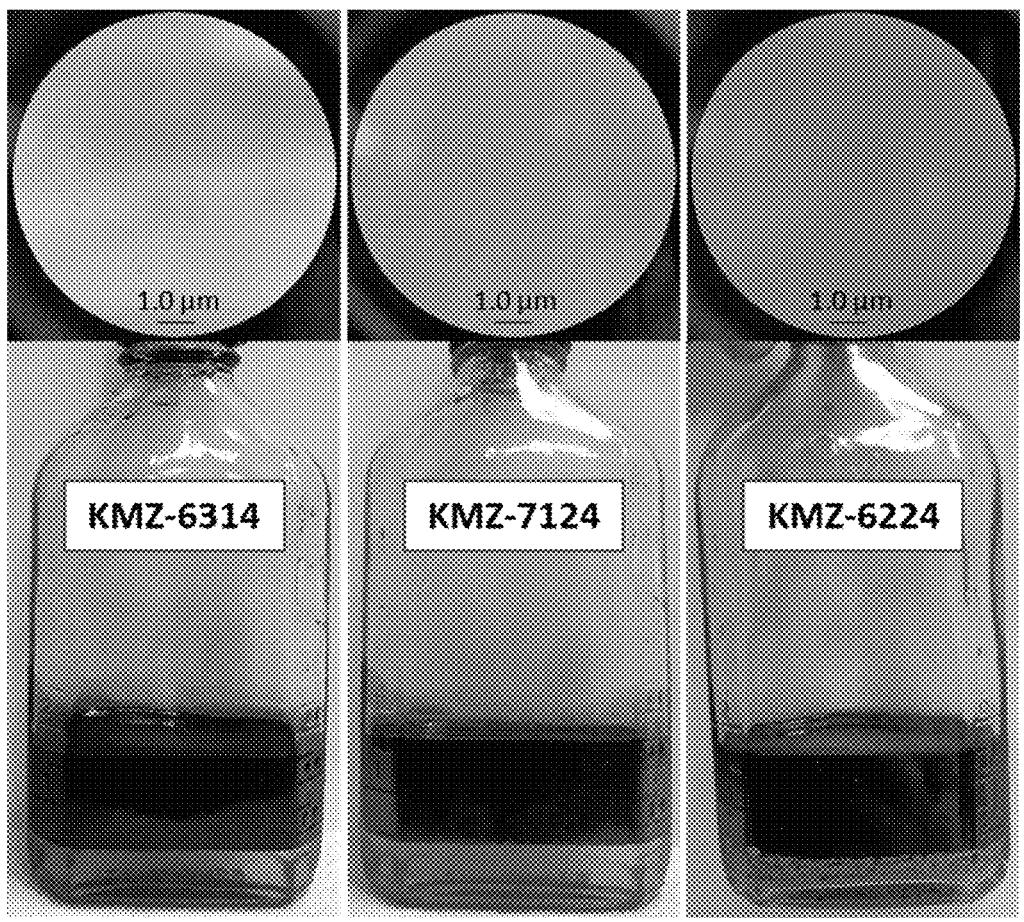
FIG. 4 shows the images of the optical micrographs and bottles corresponding to the K'anal-1 crude oil (35.30° API), after having been treated with the KMZ-6314—100 vol %—, KMZ-7124—100 vol %—and KMZ-6224—100 vol %—random terpolymers based on alkyl acrylate-ethylene alkanoate-alkoxyalkyl acrylate, at a dosage of 1000 ppm.

As can be seen in FIG. 4, in the optical micrographs of the treated K'anal-1 crude oil (35.30° API) with the KMZ-6314, KMZ-7124 and KMZ-6224 acrylic terpolymers, remaining emulsified water is not appreciated, accordingly, the total removal of emulsified water is confirmed, and thus, it is highlighted the excellent performance of these terpolymers as demulsifying agents. Regarding the clarification of the removed water, the three acrylic terpolymers—KMZ-6314, KMZ-7124 and KMZ-6224—promote an excellent clarification of the removed water, as well as a homogeneous and well-defined interface of the removed water/crude oil system.

Figure 5:
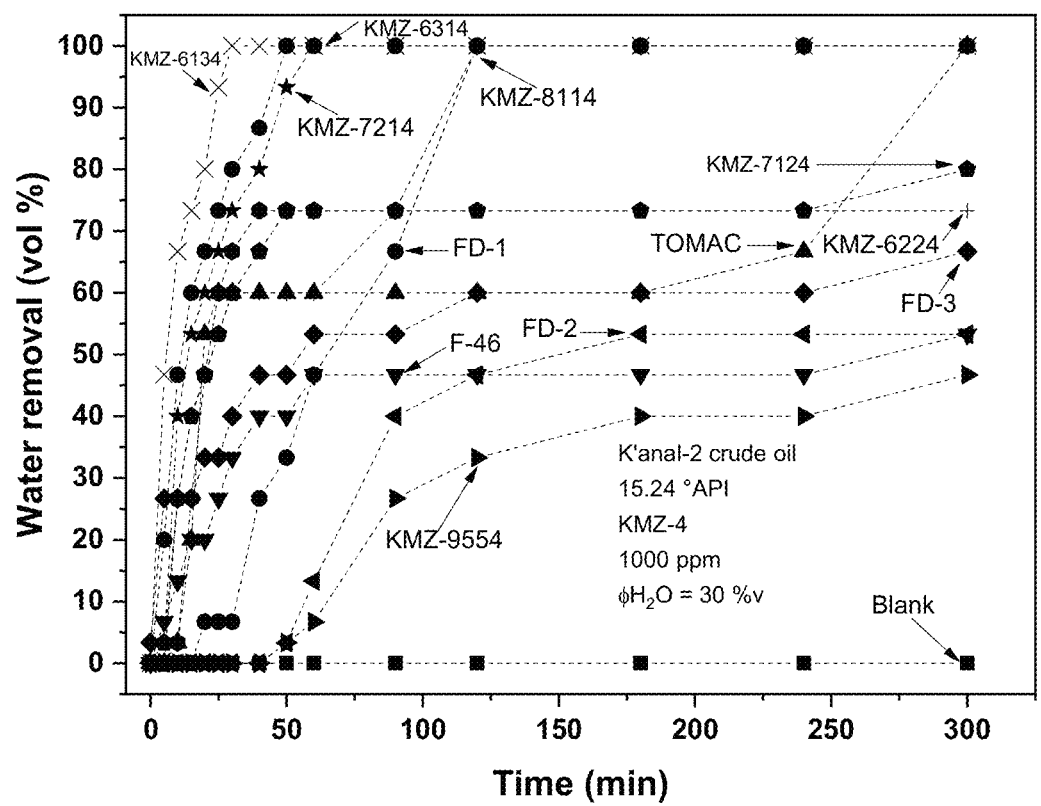
FIG. 5 exhibit the water removal efficiency of the random terpolymers based on alkyl acrylate-ethylene alkanoate-alkoxyalkyl acrylate with different monomeric composition of the KMZ-4 series, the TOMAC ionic liquid, as well as the F-46, FD-1, FD-2 and FD-3 commercial formulations, which were evaluated in the K'anal-2 crude oil (15.24° API) at a dosage of 1000 ppm.

FIG. 5 presents the results of the assessment of the random terpolymers based on alkyl acrylate-ethylene alkanoate-alkoxyalkyl acrylate of the KMZ-4 series in the K'anal-2 crude oil (15.24° API), dosage at 1000 ppm. As can be observed, the KMZ-6134 terpolymer displayed an excellent performance as coalescer, completely removing the emulsified water at 30 min of the assessment. In the case of the KMZ-6314 and KMZ-7214 terpolymers, theses displayed a slightly lower coalescence rate than the KMZ-6314 acrylic terpolymer, reaching 100% up to 50 and 60 min, respectively; whereas the KMZ-8114 terpolymer, although it displayed a lower coalescence rate than the three aforementioned acrylic terpolymers, reached the same water removal efficiency as these at 120 min of the assessment. The KMZ-7124 and KMZ-6224 terpolymers showed a lower water removal efficiency, eliminating 80 and 73 vol %, respectively. Lastly, the KMZ-9554 terpolymer displayed the lowest performance as demulsifying agent, barely removing 47 vol %. On the other hand, even though the TOMAC ionic liquid presented a low water removal efficiency—67 vol %—at 240 min of assessment in comparison with the acrylic terpolymers with a removal efficiency greater than 70%, in the last hour of the assessment its performance as coalescer remarkably increased, reaching 100 vol % of the emulsified water in the last reading of the test. Regarding the FD-1 commercial formulation, this showed a lower coalescence rate than the KMZ-8114 terpolymer; however, it displayed an excellent performance as demulsifying agent reaching a maximum removal efficiency of 99% at 120 min, performance that was leveled off until the end of the evaluation. Finally, the FD-3 commercial formulation removed 67 vol % of emulsified water; whereas FD-2 and F-46 barely removed 53 vol % of emulsified water.

Figure 6:
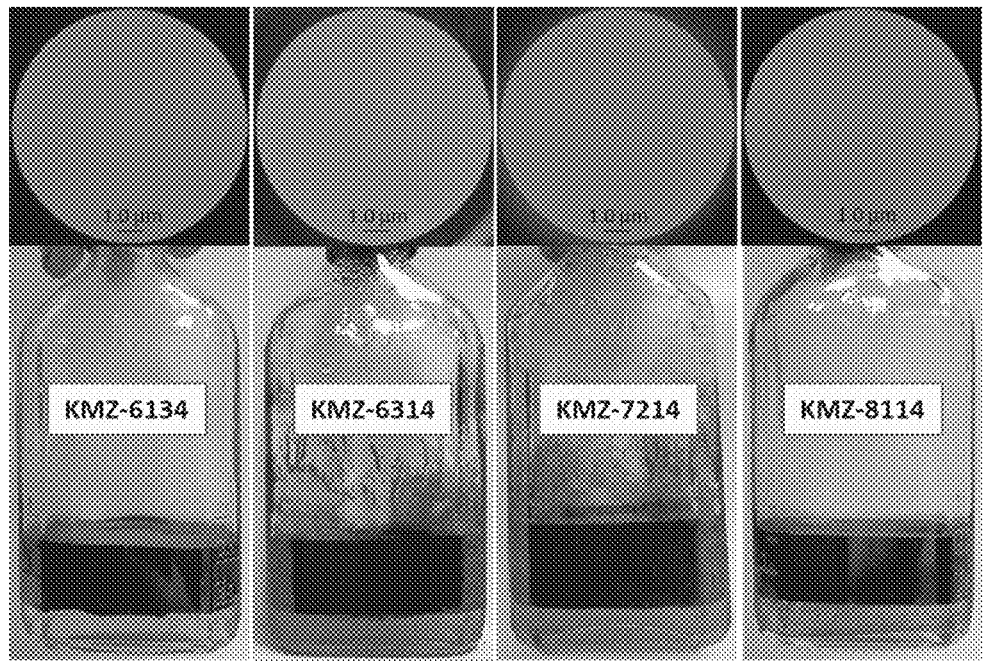
FIG. 6 shows the images of the optical micrographs and bottles corresponding to the K'anal-2 crude oil (15.24° API), after having been treated with the KMZ-6134—100 vol %—, KMZ-6314—100 vol %—, KMZ-7214—100 vol %—and KMZ-8114—100 vol %—random terpolymers based on alkyl acrylate-ethylene alkanoate-alkoxyalkyl acrylate, as well as the TOMAC—100 vol %—ionic liquid and the FD-1—99 vol %—commercial formulation, at a dosage of 1000 μm.
Figure 6:
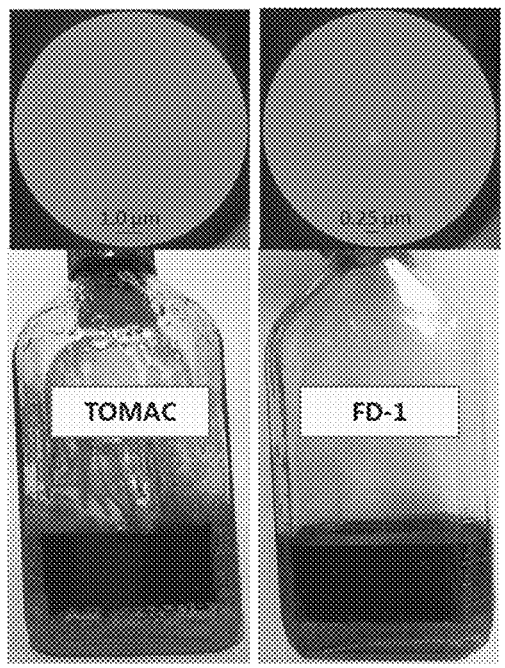

FIG. 6 exhibits the absence of remaining water in the optical micrographs of the treated crude oil with KMZ-6134—100% a 30 min—, KMZ-6314—100% at 50 min—, KMZ-7214—100% at 60 min—, KMZ-8114—100% at 120 min—and TOMAC—100% at 300 min—. In the case of the FD-1 commercial formulation—99% at 120 min—, the presence of remaining water droplets is observed, with a droplet size of approximately 0.25 µm. About the clarification of the removed water, it is notorious to highlight the excellent performance obtained with the KMZ-6134, KMZ-6314, KMZ-7214 and KMZ-8114 random acrylic terpolymers; as well as with the TOMAC ionic liquid. On the contrary, the FD-1 commercial formulation showed a lower efficiency in the clarification of the removed water.

Figure 7:
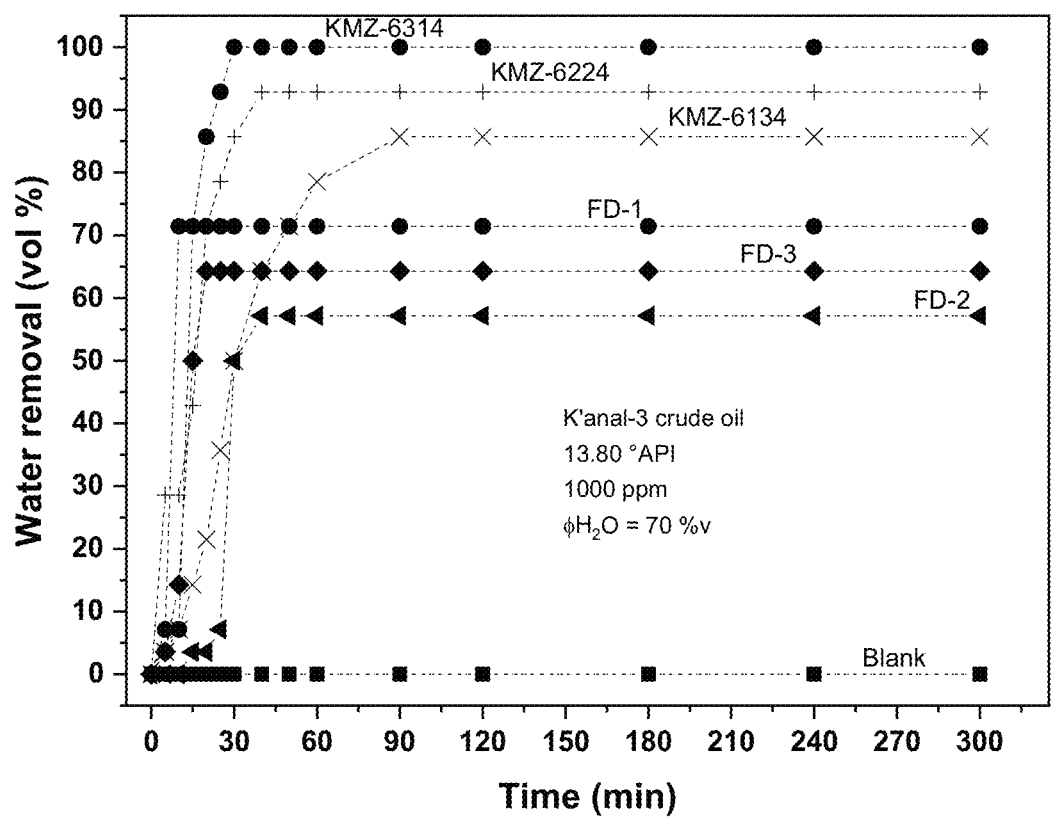
FIG. 7 presents the water removal efficiencies of the KMZ-6314, KMZ-6224 and KMZ-134 random terpolymers based on alkyl acrylate-ethylene alkanoate-alkoxyalkyl acrylate, as well as the FD-1, FD-2 and FD-3 commercial formulations, all assessment in the K'anal-3 crude oil (13.80° API) at a dosage of 1000 ppm.

FIG. 7 shows the performance of the KMZ-6314, KMZ-6224 and KMZ-6134 random terpolymers based on alkyl acrylate-ethylene alkanoate-alkoxyalkyl acrylate in the K'anal-3 crude oil (13.80° API) at a dosage of 1000 ppm. Once again, the KMZ-6314 random acrylic terpolymers exhibited an excellent performance in destabilizing the water/heavy crude oil interface, eliminating 100 vol % of emulsified water at 30 min of evaluation. With a slightly lower coalescence rate, the KMZ-6224 terpolymer managed to remove 93 vol % of water at 40 min of evaluation, whereas the KMZ-6134 terpolymer displayed the lowest water removal efficiency in regards to the acrylic-based demulsifiers, removing 86 vol % at 90 min. Despite the obtained value by this last acrylic terpolymer, the three evaluated random acrylic terpolymers showed a superior performance as demulsifying agents than the three commercial formulations. It is important to point out that by decreasing the weight ratio of the ethylene alkanoate monomer from 30 wt % to 10 wt %, the performance of the random acrylic terpolymers decreases, hence, it is evident the effect of the ethylene alkanoate monomer in the destabilization of the water/crude oil interface. Regarding the commercial products, the FD-1 formulation showed a good performance as coalescer at 10 min, managing to eliminate 72 vol % of emulsified water; nevertheless, after this time it was unable to continue promoting the destabilization of the water/crude oil interface. In the case of the FD-3 commercial formulation, its performance as demulsifying agent is inferior to that of the FD-1 formulation, only removing 64 vol %, performance reached from 20 min of evaluation and leveled off until the end of the test. Finally, the FD-2 commercial formulation showed the lowest performance as demulsifying agent, barely removing 57 vol % at 40 min of evaluation.

Figure 8:
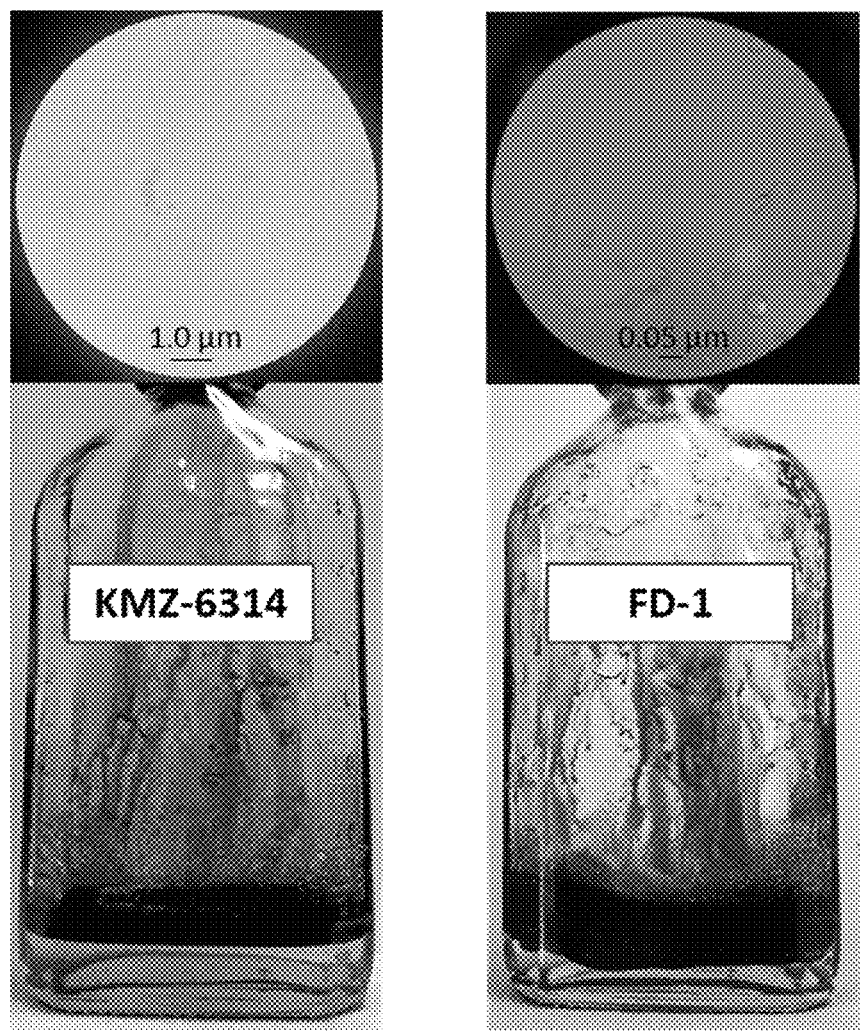
FIG. 8 exhibits the images of the optical micrographs and bottle of the K'anal-3 crude oil (13.80° API), after having been treated with the KMZ-6314—100 vol %—random acrylic terpolymer and the FD-1—72 vol %—commercial formulation, at a dosage of 1000 ppm.

FIG. 8 displays the optical micrographs of the treated crude oil with the KMZ-6314 terpolymer, where it is notorious the absence of remaining water, confirming the excellent performance of this product as demulsifying agent. In contrast, in the micrograph of the treated crude oil with the FD-1 commercial formulation was observed the presence of emulsified water with a water droplet from 0.05 to 1.00 µm; being evident that the FD-1 product was unable of utterly inducing the coalescence of water droplets with a diameter less than 1.00 µm.

Figure 9:
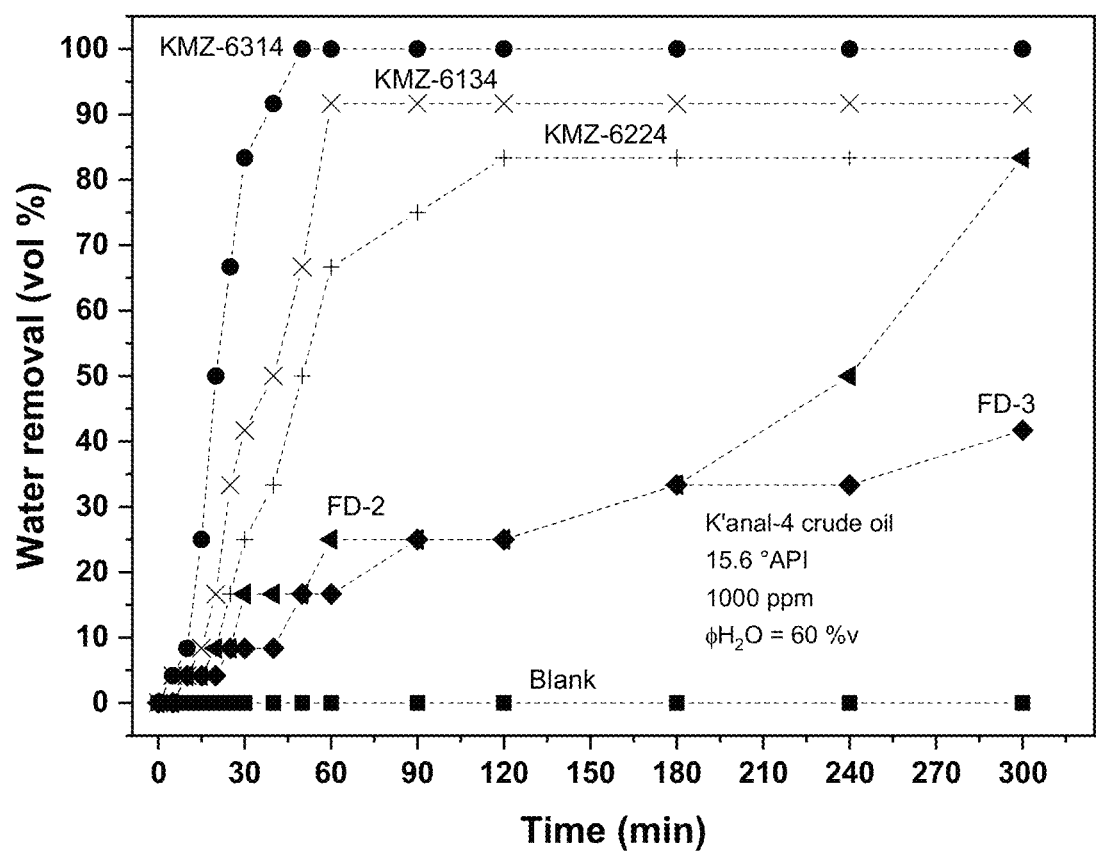
FIG. 9 reports the performance as demulsifying agents of the KMZ-6314, KMZ-6134 and KMZ-6224 random terpolymers based on alkyl acrylate-ethylene alkanoate-alkoxyalkyl acrylate, as well as the FD-2 and FD-3 commercial formulations, all assessment in the K'anal-4 crude oil (15.60° API) at a dosage of 1000 ppm.

FIG. 9 shows the performance of the KMZ-6314, KMZ-6224 and KMZ-6134 random terpolymers based on alkyl acrylate-ethylene alkanoate-alkoxyalkyl acrylate, as well as the FD-2 and FD-3 commercial products, assessed in the K'anal-4 crude oil (15.60° API) at a dosage of 1000 ppm. In this heavy crude oil, the KMZ-6314 acrylic terpolymer exhibited the best performance as demulsifying agent, completely removing the emulsified water at 50 min of test. Regarding the KMZ-6134 terpolymer, it reached a maximum efficiency of 92 vol % at 60 min of the evaluation, whereas the KMZ-6224 acrylic terpolymer displays the lowest performance of all acrylic terpolymers, only removing 83 vol % at 120 min. The FD-2 commercial formulation exhibited a lower coalescence rate in comparison with the KMZ-6224 acrylic terpolymer; however, at the end of the test, managed to remove the same amount of emulsified water that the aforementioned acrylic terpolymer. Lastly, the FD-3 commercial formulation barely removed 42 vol % of the emulsified water.

Figure 10:
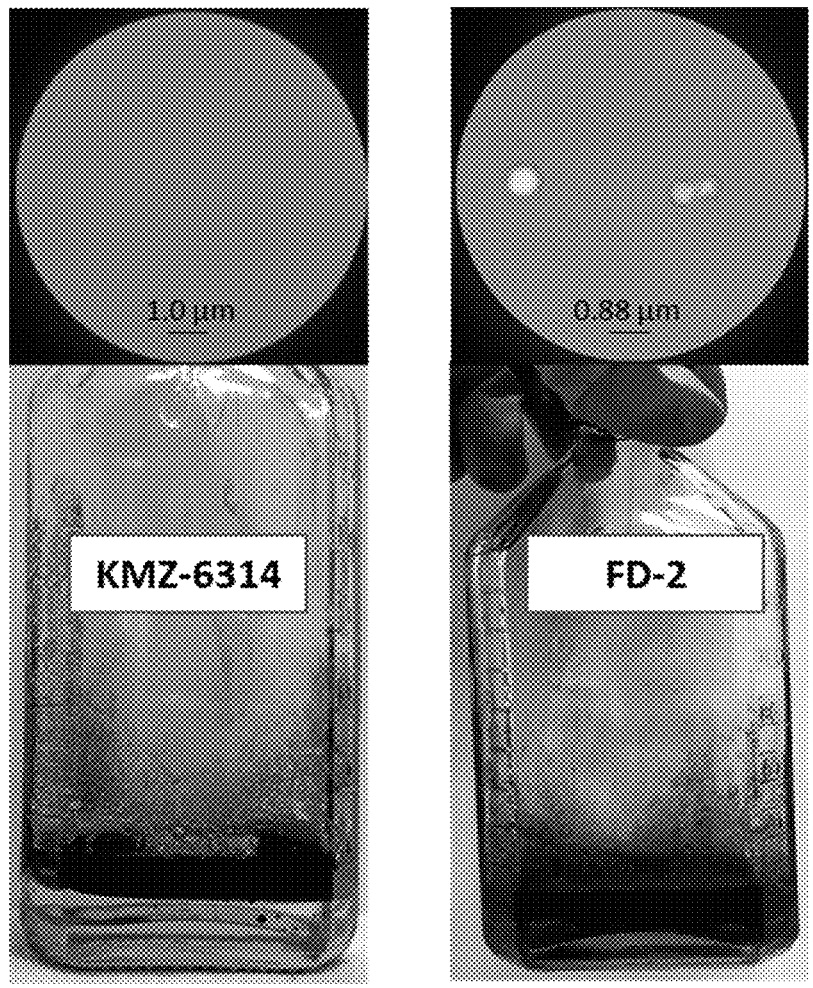
FIG. 10 displays the images of the optical micrographs and bottles of the K'anal-4 crude oil (15.60° API), after having been treated with the KMZ-6314—100 vol %—random terpolymer and with the FD-2—83 vol %—commercial formulation, both at a dosage of 1000 ppm.

In the optical micrograph of the treated crude oil with the KMZ-6314 random terpolymer—FIG. 10—, it is notorious the absence of remaining water droplets, corroborating the total water removal when this random acrylic terpolymer is employed. On the contrary, in the optical micrograph of the treated crude oil with the FD-2 commercial formulation, the presence of remaining water droplets can be observed, with a droplet diameter of 0.88 µm; therefore, this product is unable of inducing the coalesce of water droplets of this size or smaller. About the clarification of the removed water, the KMZ-6314 terpolymer presented an excellent performance at this issue, as well as a homogeneous removed water/crude oil interface. In the case of the FD-2 commercial formulation, the clarification of the removed water is acceptable, but being inferior to the obtained when the random acrylic terpolymer is employed.

The invention claimed is:

1. A random terpolymer based on alkyl acrylate-ethylene alkanoate-alkoxyalkyl acrylate as a dehydrating agent of crude oil, comprising a structural formula of molecular masses between 1,150 and 994,000 g·mol$^{-1}$ as follows:

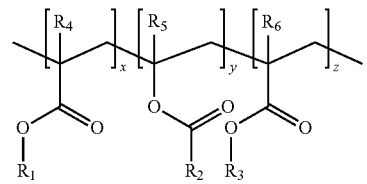

where:
R$_1$, R$_2$, R$_3$, R$_4$, R$_5$ and R$_6$ are independent radicals represented by the following groups:
R$_1$=CH$_3$ (methyl), C$_2$H$_5$ (ethyl), C$_4$H$_9$ (n-butyl), C$_4$H$_9$ (iso-butyl), C$_4$H$_9$ (tert-butyl), C$_5$H$_{11}$ (pentyl), C$_6$H$_{13}$ (n-hexyl), C$_6$H$_{11}$ (di(ethylene glycol)ethylether), C$_8$H$_{17}$ (2-ethylhexyl), C$_9$H$_{19}$ (3,5,5-trimethylhexyl), C$_8$H$_{17}$ (n-octyl), C$_8$H$_{17}$ (iso-octyl), C$_8$H$_9$ (ethylene glycol phenyl ether), C$_{10}$H$_{21}$ (n-decyl), C$_{10}$H$_{21}$ (iso-decyl), C$_{10}$H$_{19}$ (10-undecenyl), C$_{10}$H$_{19}$ (tert-butylcyclohexyl), C$_{12}$H$_{25}$ (n-dodecyl), C$_{18}$H$_{37}$ (n-octadecyl), C$_5$H$_9$O (tetrahydrofurfuryl), C$_5$H$_9$O (2-tetrahydropyranyl), C$_{13}$H$_{27}$ (tridecyl), or C$_{22}$H$_{45}$ (behenyl), and can include, in an aliphatic chain, at least one of heteroatoms of ether groups and benzene type aromatic rings or heteroatoms rings of ether groups;
R$_2$=CH$_3$ (methyl), C$_2$H$_5$ (ethyl), C$_3$H$_7$ (propyl), C$_4$H$_9$ (n-butyl), (CH$_3$)$_3$C (t-butyl), C$_6$H$_5$ (phenyl), C$_8$H$_{17}$ (n-octyl), C$_9$H$_{19}$ (n-nonyl), C$_{11}$H$_{23}$ (undecyl), or C$_{17}$H$_{35}$ (octadecanyl);
R$_3$=C$_2$H$_5$O (methoxymethyl), C$_3$H$_7$O (2-methoxyethyl), C$_4$H$_9$O (2-ethoxyethyl), C$_4$H$_9$O (3-methoxipropyl), C$_5$H$_{11}$O (3-ethoxypropyl), C$_5$H$_{11}$O$_2$ (2-(2-methoxyethoxi)ethyl), or C$_8$H$_9$O (2-phenoxyethyl), wherein an alkylalkoxy fragment could include phenyls, alkyls of cyclic or branched chain from C$_1$ to C$_{20}$;
R$_4$ and R$_6$=H (hydrogen) and/or CH$_3$ (methyl); and
R$_5$=H, CH$_3$ and/or CN;
wherein:
x=is a number set up from 4 to 1075;
y=is a number set up from 4 to 1075;
z=is a number set up from 4 to 1075; and
x, y and z may optionally occur as random sequences.

2. The random terpolymer according to claim 1, wherein the random terpolymer comprises a ratio of alkyl acrylate monomer in an amount in a range from about 55.00 and 99.50 wt %, ethylene alkanoate monomer in an amount in a range from about 0.25 to 44.75 wt % and alkoxyalkyl acrylate monomer in an amount in a range from about 0.25 and 44.75 wt %.

3. The random terpolymer according to claim 2, wherein the alkyl acrylate monomers are selected from the group consisting of methyl acrylate, ethyl acrylate, butyl acrylate, pentyl acrylate, iso-butyl acrylate, tert-butyl acrylate, hexyl acrylate, 2-ethylhexyl acrylate, 3,5,5-trimethylhexyl acrylate, 4-tert-butylcyclohexyl acrylate, octyl acrylate, iso-decyl acrylate, decyl acrylate, lauryl acrylate, tridecyl acrylate, octadecyl acrylate, behenyl acrylate, methyl methacrylate, ethyl methacrylate, butyl methacrylate, pentyl methacrylate, iso-butyl methacrylate, tert-butyl methacrylate, hexyl methacrylate, 2-ethylhexyl methacrylate, 3,5,5-trimethylhexyl methacrylate, 4-tert-butylcyclohexyl methacrylate, octyl methacrylate, iso-decyl methacrylate, decyl methacrylate, lauryl methacrylate, tridecyl methacrylate, octadecyl methacrylate, and behenyl methacrylate.

4. The random terpolymer according to claim 2, wherein the ethylene alkanoate monomers are selected from the group consisting of vinyl acetate, vinyl propanoate, vinyl butyrate, vinyl trimehtylacetate, vinyl pentanoate, vinyl benzoate, vinyl laureate, vinyl neononanoate, vinyl decanoate, vinyl octadecanoate, 1-methylvinyl acetate, and 1-cianovinyl acetate.

5. The random terpolymer according to claim 2, wherein the alkoxyalky acrylate monomers are selected from the group consisting of 2-methoxyethyl acrylate, 2-phenoxyethyl acrylate, di(ethylene glycol)ethyl ether acrylate, 2-methoxyethyl methacrylate, 2-phenoxyethyl methacrylate, di(ethylene glycol)ethyl ether methacrylate, 2-ethoxyethyl acrylate, 2-ethoxyethyl methacrylate, 2-butoxyethyl acrylate, 2-butoxyethyl methacrylate, 2-ethoxymethyl acrylate, and 2-ethoxymethyl methacrylate.

6. The random terpolymer according to claim 1, wherein the random terpolymer comprises a hydrophilic initiator in a range from about 0.10 to 10.00 wt % in regard to total amount of monomers in a system.

7. A process of synthesizing random terpolymer based on alkyl acrylate-ethylene alkanoate-alkoxyalkyl acrylate according to claim 1, wherein the process comprises:
(i) a semi-continuous polymerization process comprising adding a pre-emulsion of monomers, under reagent starved feed conditions, from an addition tank, wherein the alkyl acrylate monomer is in an amount from about 55.00 and 99.50 wt %, the ethylene alkanoate monomer is in an amount from about 0.25 to 44.75 wt %, and the alkoxyalkyl acrylate monomer is in an amount from about 0.25 and 44.75 wt %;
(ii) a feed rate to a main reactor is in a range from about 0.0001 to 0.0025 g·mL min$^{-1}$;
(iii) addition of a hydrophilic initiator is from a second addition tank to the main reactor, in proportions ranging from about 0.10 to 10.00 wt %, in regard to the total amount of monomers, to have a constant formation of free radicals in the system;
(iv) the addition rate of the initiator to the main reactor is carried out in a range from about 0.0001 to 0.0040 g·mL min$^{-1}$; and
(v) the temperature of the reactor is set in a range from about 45 to 95° C.

8. A method of using the random terpolymers based alkyl acrylate-ethylene alkanoate-alkoxyalkyl acrylate as dehydrating agents of crude oil according to claim 1, wherein the concentration of the dry random acrylic terpolymer in the formulation is from 0.50 to 50.00%.

9. The method according to claim 8, wherein the dry random acrylic terpolymer is dissolved in solvents such as dichloromethane, methanol, ethanol, isopropanol, 2-butoxyethanol, 2-butoxyethane acetate, chloroform, benzene and its derivates, toluene, xylene, jet fuel and naphtha, individually or as a mixture.

10. The method according to claim 8, wherein the formulation is dosed to the crude oil at a concentration in a range from about 3 to 3000 ppm.

* * * * *